US012487542B2

(12) United States Patent
Itabashi

(10) Patent No.: US 12,487,542 B2
(45) Date of Patent: *Dec. 2, 2025

(54) DEVELOPING CARTRIDGE

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,874

(22) Filed: May 22, 2024

(65) Prior Publication Data

US 2024/0319633 A1 Sep. 26, 2024

Related U.S. Application Data

(63) Continuation of application No. 18/057,292, filed on Nov. 21, 2022, now Pat. No. 12,181,806, which is a (Continued)

(30) Foreign Application Priority Data

Mar. 26, 2019 (JP) ................................ 2019-058549
Jan. 28, 2020 (JP) ................................ 2020-011316

(51) Int. Cl.
*G03G 15/08* (2006.01)
*G03G 21/16* (2006.01)

(52) U.S. Cl.
CPC ..... *G03G 15/0865* (2013.01); *G03G 15/0808* (2013.01); *G03G 15/0889* (2013.01); *G03G 21/1676* (2013.01)

(58) Field of Classification Search
CPC .......... G03G 21/1676; G03G 21/1647; G03G 2221/1684; G03G 2221/1654
See application file for complete search history.

(56) References Cited

U.S. PATENT DOCUMENTS 7,643,774 B2 1/2010 Choi
2007/0059018 A1 3/2007 Tokuda
(Continued)

FOREIGN PATENT DOCUMENTS

CN 1940744 A 4/2007
CN 1991622 A 7/2007
(Continued)

OTHER PUBLICATIONS

International Search Report with a Written Opinion issued by the International Searching Authority in corresponding International Patent Application No. PCT/JP2020/012278, Jun. 23, 2020.
(Continued)

*Primary Examiner* — Jessica L Eley
(74) *Attorney, Agent, or Firm* — Merchant & Gould P.C.

(57) ABSTRACT

A developing cartridge may include a developing roller, a casing capable of containing a developer therein, a developing electrode movable with the casing and the developing roller and pivotable about a developing roller shaft of the developing roller in a direction, a first lever movable relative to the casing, and a holder configured to hold the first lever relative to the casing, in case where the developing electrode pivots from one side of the direction to an other side of the direction, the first lever stops the pivotable movement of the developing electrode from one side of the direction to the other side of the direction and the holder prevents the first lever from coming off the holder from the one side of the direction to the other side of the direction.

5 Claims, 28 Drawing Sheets

Related U.S. Application Data continuation of application No. 17/172,273, filed on Feb. 10, 2021, now Pat. No. 11,513,452, which is a continuation of application No. 16/826,688, filed on Mar. 23, 2020, now Pat. No. 10,921,731.

(56) References Cited

U.S. PATENT DOCUMENTS

| | | | | |
|---|---|---|---|---|
| 2007/0071480 | A1 | 3/2007 | Ishikawa | |
| 2007/0071481 | A1 | 3/2007 | Kamimura | |
| 2007/0077093 | A1 | 4/2007 | Okabe et al. | |
| 2007/0147888 | A1 | 6/2007 | Igarashi et al. | |
| 2007/0166070 | A1 | 7/2007 | Sato | |
| 2010/0067947 | A1 | 3/2010 | Yuzawa | |
| 2010/0111562 | A1 | 5/2010 | Okabe et al. | |
| 2010/0166453 | A1 | 7/2010 | Okabe | |
| 2011/0236066 | A1 | 9/2011 | Takagi | |
| 2012/0219331 | A1 | 8/2012 | Kobayashi | |
| 2012/0308259 | A1 | 12/2012 | Abe | |
| 2013/0051849 | A1 | 2/2013 | Itabashi et al. | |
| 2013/0251402 | A1 | 9/2013 | Yamashita et al. | |
| 2015/0010329 | A1* | 1/2015 | Fujii | G03G 21/1647 399/119 |
| 2015/0192878 | A1 | 7/2015 | Iriyama et al. | |
| 2015/0205254 | A1 | 7/2015 | Fujii et al. | |
| 2015/0253725 | A1* | 9/2015 | Handa | G03G 21/1676 399/119 |
| 2016/0062309 | A1 | 3/2016 | Satomura et al. | |
| 2017/0261927 | A1 | 9/2017 | Sato et al. | |
| 2017/0269546 | A1 | 9/2017 | Yokoi | |
| 2017/0285570 | A1 | 10/2017 | Sakata et al. | |
| 2017/0336754 | A1 | 11/2017 | Itabashi | |
| 2018/0004123 | A1 | 1/2018 | Itbashi et al. | |
| 2018/0017893 | A1 | 1/2018 | Shimizu et al. | |
| 2018/0095416 | A1 | 4/2018 | Nishiyama et al. | |
| 2018/0181022 | A1 | 6/2018 | Itabashi | |
| 2018/0299823 | A1 | 10/2018 | Uyama et al. | |
| 2021/0063935 | A1* | 3/2021 | Taguchi | G03G 15/087 |
| 2024/0241476 | A1* | 7/2024 | Itabashi | G03G 21/1867 |

FOREIGN PATENT DOCUMENTS

| | | | |
|---|---|---|---|
| CN | 201229468 | Y | 4/2009 |
| CN | 101833262 | A | 9/2010 |
| CN | 102200726 | A | 9/2011 |
| CN | 202748592 | U | 2/2013 |
| CN | 103324072 | A | 9/2013 |
| CN | 104412173 | A | 3/2015 |
| CN | 107229202 | A | 10/2017 |
| CN | 206594453 | A | 10/2017 |
| CN | 107402510 | A | 11/2017 |
| CN | 107861349 | A | 3/2018 |
| CN | 108241269 | A | 7/2018 |
| JP | 5-46019 | A | 2/1993 |
| JP | 2003-186300 | A | 7/2003 |
| JP | 2007-79284 | A | 3/2007 |
| JP | 2009-58560 | A | 3/2009 |
| JP | 2010-72307 | A | 4/2010 |
| JP | 2012-177875 | A | 9/2012 |
| JP | 2013-54058 | A | 3/2013 |
| JP | 5-281854 | A | 9/2013 |
| JP | 2015-11318 | A | 1/2015 |
| JP | 2016-51067 | A | 4/2016 |
| JP | 2018-4907 | A | 1/2018 |
| JP | 2018-5177 | A | 1/2018 |
| WO | 2014/141447 | A1 | 9/2014 |

OTHER PUBLICATIONS

International Search Report with a Written Opinion issued by the International Searching Authority in corresponding International Patent Application No. PCT/JP2020/012279, Jun. 23, 2020.

International Search Report with a Written Opinion issued by the International Searching Authority in corresponding International Patent Application No. PCT/JP2020/012280, Jul. 7, 2020.

International Search Report with a Written Opinion issued by the International Searching Authority in corresponding International Patent Application No. PCT/JP2020/012281, Jun. 23, 2020.

Extended European Search Report issued in corresponding European Patent Application No. 20710757.4, Aug. 2, 2021.

Extended European Search Report issued in corresponding European Patent Application No. 20710756.6, Oct. 21, 2021.

Office Action (Notice of Reasons for Refusal) issued in corresponding Japanese Patent Application No. 2019-058549, Feb. 21, 2023.

Notification of First Office Action with Search Report issued in corresponding Chinese Patent Application No. 202080023200.2, Sep. 27, 2023.

Office Action with Search Report issued in corresponding Chinese Patent Application No. 202080023316.6, Jan. 11, 2024.

Extended European Search Report issued in European Patent Application No. 20710758.2, Jul. 6, 2021.

Extended European Search Report issued in European Patent Application No. 20710755.8, Jul. 6, 2021.

Examination Report issued in Australian Patent Application No. 2020246265, Mar. 22, 2022.

Examiner's Requisition issued in Canadian Patent Application No. 3,114,158, Apr. 27, 2022.

Notice of Reasons for Refusal in Japanese Patent Application No. 2023-104695, May 7, 2024.

* cited by examiner

DEVELOPING CARTRIDGE

CROSS-REFERENCE TO RELATED APPLICATION

This application is a continuation of U.S. patent application Ser. No. 18/057,292, filed Nov. 21, 2022, now U.S. Pat. No. 12,181,806, which is a continuation of U.S. patent application Ser. No. 17/172,273, filed Feb. 10, 2021, now U.S. Pat. No. 11,513,452, which is a continuation of U.S. patent application Ser. No. 16/826,688, filed Mar. 23, 2020, now U.S. Pat. No. 10,921,731, which claims priority from Japanese Patent Application No. 2019-058549 filed on Mar. 26, 2019 and Japanese Patent Application No. 2020-011316 filed on Jan. 28, 2020. The content of the aforementioned applications is incorporated herein by reference in its entirety.

TECHNICAL FIELD

The present disclosure relates to a developing cartridge.

BACKGROUND

Electro-photographic image forming apparatuses, such as laser printers and LED printers, have been developed. A developing cartridge is used in an image forming apparatus. The developing cartridge includes a developing roller for supplying a developer material.

The conventional developing cartridge 1 is mounted on a drum cartridge. The drum cartridge includes a photosensitive drum. When the developing cartridge is mounted on the drum cartridge, the photosensitive drum is brought into contact with the developing roller. Thereafter, the drum cartridge having the developing cartridge mounted therein is mounted in the image forming apparatus.

SUMMARY

The developing cartridge includes a member for positioning the developing roller relative to the photosensitive drum. The developing cartridge further includes a developing electrode for supplying a bias voltage to a shaft of the developing roller. Still furthermore, the developing cartridge includes a member that receives a pressing force when separating the developing roller from the photosensitive drum. However, if the member for positioning the developing roller, the developing electrode for supplying a bias voltage to the shaft of the developing roller, and the member for receiving a pressing force at the time of separation are separately provided, the number of parts in the developing cartridge increases.

Accordingly, the object of the present disclosure is to provide a structure capable of reducing the number of parts in a developing cartridge.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

1. First Embodiment

Embodiments of the present disclosure are described below with reference to the accompanying drawings.

Hereinafter, the direction in which a developing roller 30 of a developing cartridge 1 extends is referred to as a "first direction". In addition, the direction between which an agitator 20 and the developing roller 30 of the developing cartridge 1 are arranged is referred to as a "second direction". The first direction and the second direction cross (preferably, orthogonally cross) each other.

<1-1. Overview of Developer Cartridge and Drum Cartridge>

Figure 1:
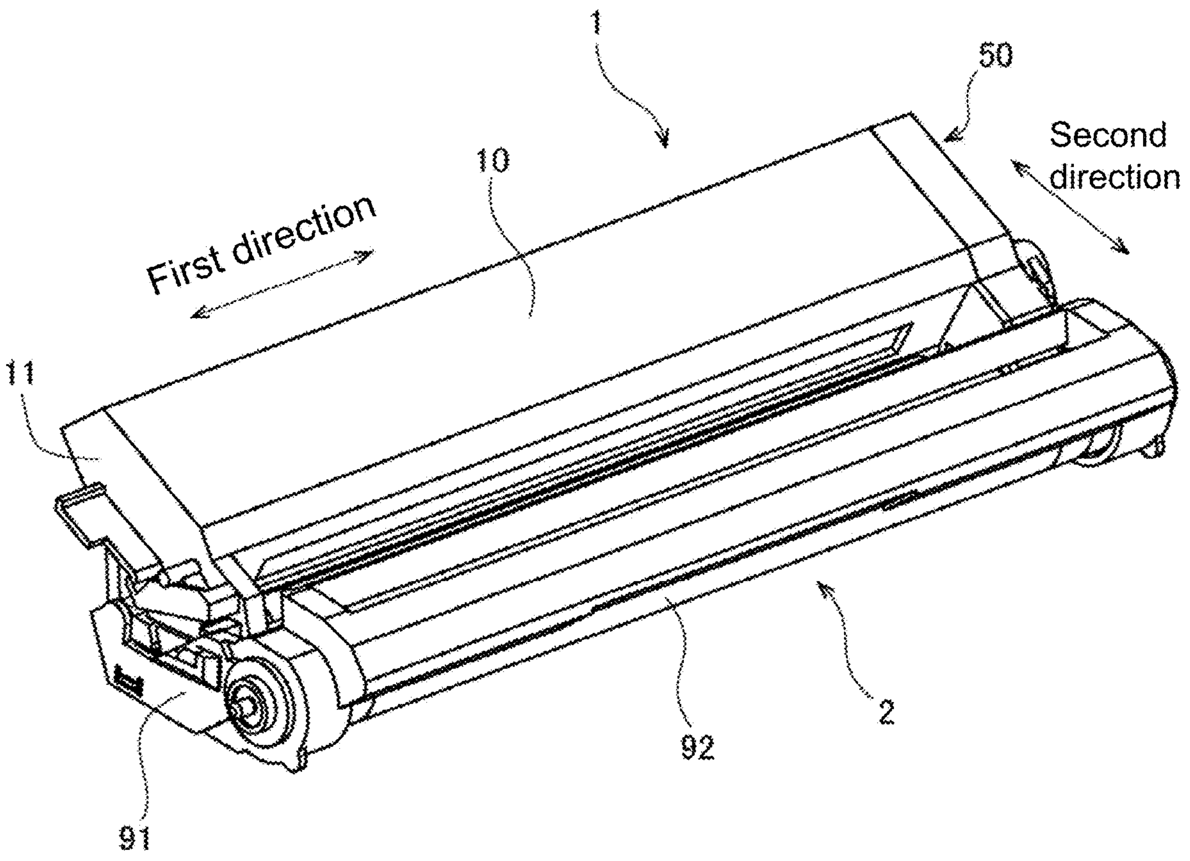
FIG. 1 is a perspective view of a developing cartridge and a drum cartridge in a first embodiment.

FIG. 1 is a perspective view of the developing cartridge 1 and the drum cartridge 2. In FIG. 1, the developing cartridge 1 is mounted on the drum cartridge 2. The developing cartridge 1 and the drum cartridge 2 are used in an electro-photographic image forming apparatus. An example of the image forming apparatus is a laser printer or an LED printer.

As illustrated in FIG. 1, the developing cartridge 1 is used together with the drum cartridge 2. The developing cartridge 1 is mountable on the drum cartridge 2. The developing cartridge 1 is mounted on the drum cartridge 2 and, thereafter, is mounted in the image forming apparatus. The image forming apparatus allows, for example, four developing cartridges 1 to be mounted therein. The four developing cartridges 1 contain developer materials (for example, toner) of different colors (for example, cyan, magenta, yellow, and black). The image forming apparatus forms an image on a recording surface of print paper by using the developer materials supplied from the developing cartridges 1. Note that the number of developing cartridges 1 mountable in the image forming apparatus may be one or more and so, in addition to being four, may be one to three, or five or more.

<1-2. Information about Developing Cartridge>

Figure 2:
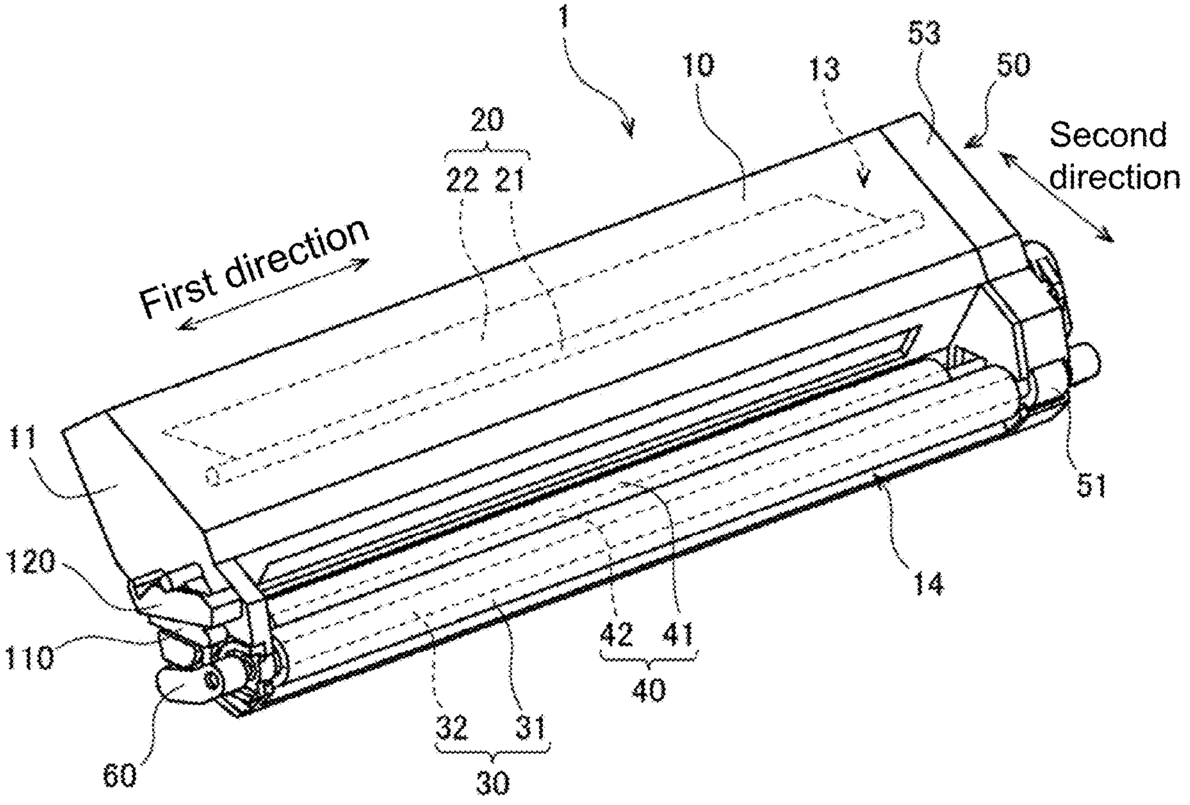
FIG. 2 is a perspective view of the developing cartridge in the first embodiment.
Figure 3:
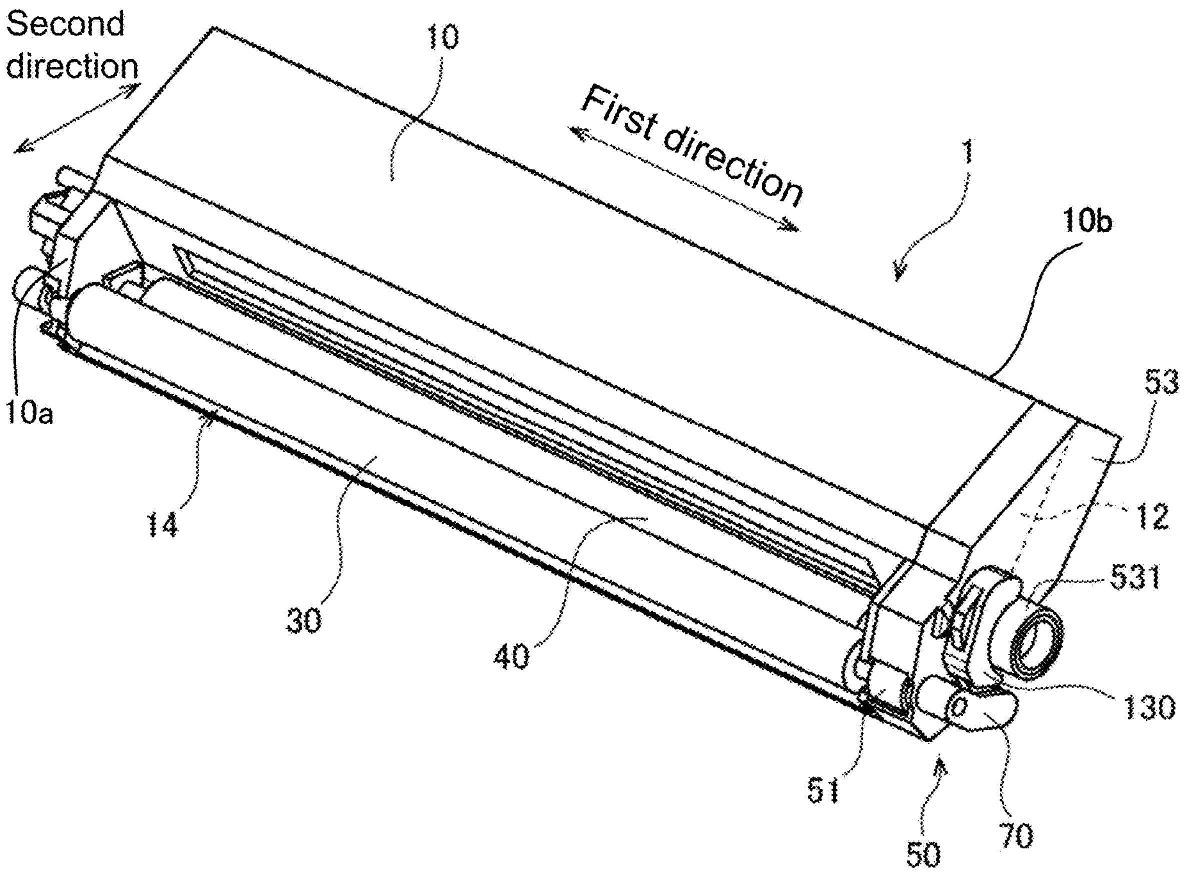
FIG. 3 is a perspective view of the developing cartridge in the first embodiment.
Figure 4:
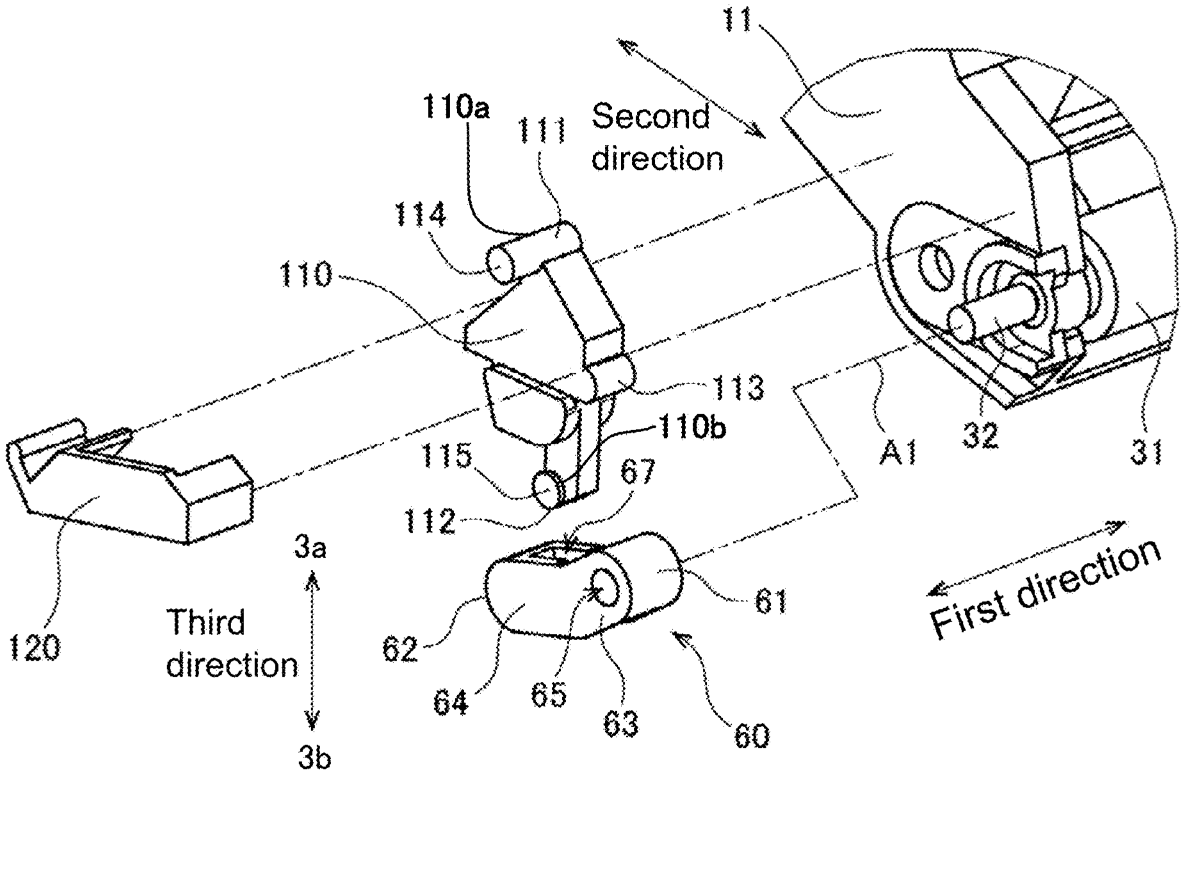
FIG. 4 is an exploded perspective view of a portion of the developing cartridge in the vicinity of a first outer surface of a casing in the first embodiment.
Figure 5:
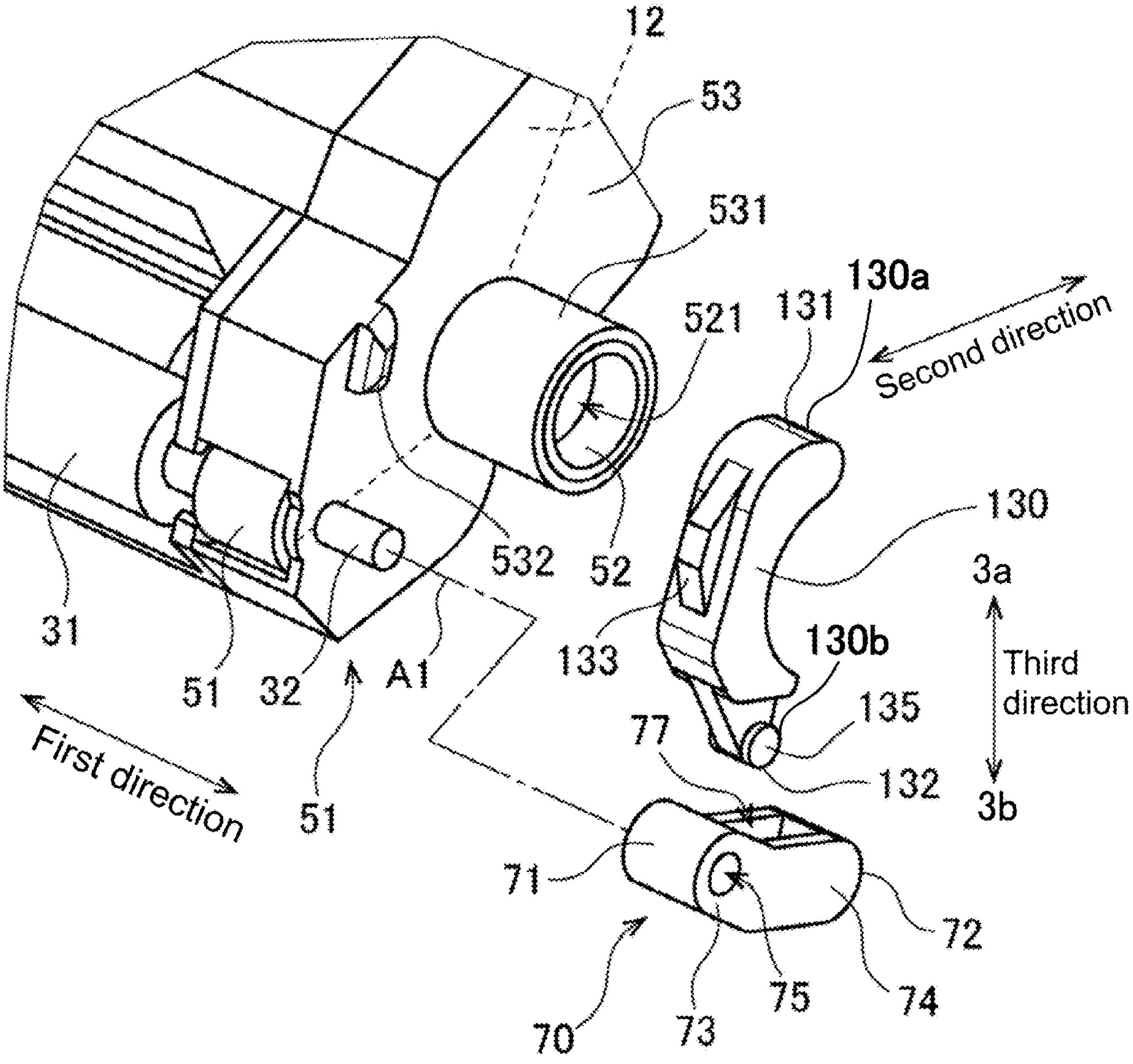
FIG. 5 is an exploded perspective view of a portion of the developing cartridge in the vicinity of a second outer surface of the casing in the first embodiment.

FIGS. 2 and 3 are perspective views of the developing cartridge 1. FIG. 4 is a view of the developing cartridge 1, in particular an exploded perspective view in the vicinity of a first outer surface 11 of a casing 10. FIG. 5 is a view of the developing cartridge 1, in particular an exploded perspective view in the vicinity of a second outer surface 12 of the casing 10. As illustrated in FIGS. 1 to 5, the developing cartridge 1 includes the casing 10, the agitator 20, the developing roller 30, a supply roller 40, a gear unit 50, a first bearing (otherwise described as a "developing electrode", or "member") 60, a first lever 110, a holder 120, a second bearing 70, and a second lever 130.

The casing 10 is a casing capable of containing a developer material. The casing 10 has a first outer surface 11 and a second outer surface 12. The first outer surface 11 is located at one end of the casing 10 in the first direction. The second outer surface 12 is located at the other end of the casing 10 in the first direction. The first outer surface 11 and the second outer surface 12 are separated from each other in the first direction. The casing 10 extends in the first direction between the first outer surface 11 and the second outer surface 12. In addition, the casing 10 extends in the second direction.

The casing 10 has an accommodation chamber 13 provided thereinside. The developer material is stored in the accommodation chamber 13. In addition, the casing 10 has an opening 14. The opening 14 is located at one end 10*a* of the casing 10 in the second direction. The outside of the casing 10, in other words the external space, and the accommodation chamber 13 of the casing 10 communicate with each other through the opening 14. Note that the casing 10 may have a handle on the outer surface at the other end 10*b* in the second direction.

The agitator 20 includes an agitator shaft 21 and a blade 22. The agitator shaft 21 extends in the first direction. The blade 22 extends or expands from the agitator shaft 21 toward the inner surface of the casing 10. The blade 22 and part of the agitator shaft 21 are disposed in the accommodation chamber 13 of the casing 10. An agitator gear (not illustrated) included in the gear unit 50 is attached to one end of the agitator shaft 21 in the first direction. The agitator shaft 21 is fixed to the agitator gear so as not to rotate relative to the agitator gear. When the agitator gear rotates, the agitator shaft 21 and the blade 22 rotate about the rotation axis extending in the first direction. Thus, the developer material is agitated in the accommodation chamber 13 by the blade 22 that is rotating.

The developing roller 30 is a roller that can rotate about a rotation axis A1 extending in the first direction. The developing roller 30 is located in the opening 14 of the casing 10. That is, the developing roller 30 is located at the one end of the casing 10 in the second direction. The developing roller 30 includes a developing roller main body 31 and a developing roller shaft 32. The developing roller main body 31 is a cylindrical member extending in the first direction. As the material used for the developing roller main body 31, rubber having resilience is used, for example. The developing roller shaft 32 is a cylindrical member that extends in the first direction and passes completely through the developing roller main body 31. The developing roller shaft 32 is electrically conductive. For the material of the developing roller shaft 32, metal or resin having electrical conductivity is used.

The developing roller main body 31 is fixed to the developing roller shaft 32 so as not to rotate relative to the developing roller shaft 32. Furthermore, a developing roller gear 51 included in the gear unit 50 is attached to an end portion of the developing roller shaft 32 in the first direction. The developing roller shaft 32 is fixed to the developing roller gear 51 so as not to rotate relative to the developing roller gear 51. Accordingly, when the developing roller gear 51 rotates, the developing roller shaft 32 rotates, and the developing roller main body 31 also rotates together with the developing roller shaft 32.

Note that the developing roller shaft 32 need not pass completely through the developing roller main body 31 in the first direction. For example, the developing roller shaft 32 may comprise two respective parts that extend in the first direction from both ends of the developing roller main body 31 in the first direction.

The supply roller 40 is a roller that is rotatable about a rotation axis extending in the first direction. The supply roller 40 is located between the agitator 20 and the developing roller 30. The supply roller 40 includes a supply roller main body 41 and a supply roller shaft 42. The supply roller main body 41 is a cylindrical member extending in the first direction. As the material used for the supply roller main body 41, rubber having resilience is used, for example. The supply roller shaft 42 is a columnar member extending in the first direction so as to pass completely through the supply roller main body 41.

The supply roller main body 41 is fixed to the supply roller shaft 42 so as not to rotate relative to the supply roller shaft 42. In addition, a supply roller gear (not illustrated) included in the gear unit 50 is attached to an end of the supply roller shaft 42 in the first direction. The supply roller shaft 42 is fixed to the supply roller gear so as not to rotate relative to the supply roller gear. Consequently, when the supply roller gear rotates, the supply roller shaft 42 also rotates and, thus, the supply roller main body 41 also rotates together with the supply roller shaft 42.

Note that the supply roller shaft 42 need not pass completely through the supply roller main body 41 in the first direction. For example, the supply roller shaft 42 may comprise two respective parts that extend in the first direction from both ends of the supply roller main body 41 in the first direction.

When the developing cartridge 1 receives the driving force, the developer material is supplied from the accommodation chamber 13 in the casing 10 to the outer peripheral surface of the developing roller 30 via the supply roller 40. At this time, the developer material is triboelectrically charged between the supply roller 40 and the developing roller 30. In addition, a bias voltage is applied to the developing roller shaft 32 of the developing roller 30. For this reason, the developer material is attracted to the outer peripheral surface of the developing roller main body 31 by the electrostatic force between the developing roller shaft 32 and the developer material.

Furthermore, the developing cartridge 1 includes a layer thickness regulation blade (not illustrated). The layer thickness regulation blade shapes the developer material supplied onto the outer peripheral surface of the developing roller main body 31 into a predetermined thickness. Thereafter, the developer material on the outer peripheral surface of the developing roller main body 31 is supplied to a photosensitive drum 92 (described below) of the drum cartridge 2. At this time, the developer material moves from the developing roller main body 31 onto the photosensitive drum 92 in accordance with an electrostatic latent image formed on the outer peripheral surface of the photosensitive drum 92. In this manner, the electrostatic latent image is visualized on the outer peripheral surface of the photosensitive drum 92.

The gear unit 50 is located the second outer surface 12 of the casing 10. As illustrated in FIG. 5, the gear unit 50 includes the above-described agitator gear, developing roller gear 51, and supply roller gear, and a plurality of idle gears, a coupling 52, and a gear cover 53. The gear cover 53 and the casing 10 together constitute the overall casing of the developing cartridge 1. The gear cover 53 is fixed to the second outer surface 12 of the casing 10 by, for example, screwing. At least some of the plurality of gears are located between the second outer surface 12 and the gear cover 53.

The gear cover 53 includes a cylindrical collar 531 protruding in the first direction. The coupling 52 is housed inside the collar 531. The coupling 52 has an engagement portion 521 that is recessed in the first direction. The engagement portion 521 is exposed from the gear cover 53. When the developing cartridge 1 mounted on the drum cartridge 2 is mounted in an image forming apparatus having a drive shaft, the drive shaft of the image forming apparatus is connected to the engagement portion 521 of the coupling 52. Thus, the rotation of the drive shaft of the image forming apparatus is transmitted to the agitator gear, the plurality of idle gears, the developing roller gear 51, and the supply roller gear via the coupling 52.

The plurality of gears included in the gear unit 50 may transmit the rotational force by meshing of teeth or may transmit the rotational force by friction.

The first bearing 60 is located at the first outer surface 11 of the casing 10. The first bearing 60 rotatably supports one end portion of the developing roller shaft 32 in the first direction. As illustrated in FIG. 4, the first bearing 60 has a first end portion 61 and a second end portion 62. The second end portion 62 is farther away from the developing roller shaft 32 than the first end portion 61. In addition, the second end portion 62 is farther away in the second direction from the one end 10*a* of the casing 10 in the second direction than the first end portion 61 is to the one end 10*a* of the casing in the second direction. The first bearing 60 extends along the first outer surface 11 of the casing 10 between the first end portion 61 and the second end portion 62.

The first bearing 60 includes a first arm 63 and a second arm 64. The second arm 64 is farther away from the developing roller shaft 32 than the first arm 63. In addition, the second arm 64 is farther away from the one end 10*a* in the second direction of the casing 10 than the first arm 63 is to the one end 10*a* in the second direction. The first arm 63 has the first end portion 61 described above. The second arm 64 has the second end portion 62 described above. The first arm 63 extends along the first outer surface 11 of the casing 10, for example, linearly. The second arm 64 extends along the first outer surface 11 of the casing 10, for example, linearly. Note that the first arm 63 is at an angle to the second arm 64. The angle formed by the first arm 63 and the second arm 64 is an obtuse angle.

According to the present embodiment, the first arm 63 and the second arm 64 are integrally formed. However, the first arm 63 and the second arm 64 may be separate parts. In this case, the first arm 63 and the second arm 64 can be fixed to each other.

The first bearing 60 has a first insertion hole 65. The first insertion hole 65 extends in the first direction in the first end portion 61 of the first bearing 60. The first insertion hole 65 may be a through-hole passing through the first end portion 61 in the first direction. Alternatively, the first insertion hole 65 may be a hole that does not pass through the first end portion 61. The first insertion hole 65 has a cylindrical inner peripheral surface. One end portion of the developing roller shaft 32 in the first direction is inserted into the first insertion hole 65. In this manner, the first bearing 60 is attached to the one end portion of the developing roller shaft 32 in the first direction. Thus, the one end portion of the developing roller shaft 32 in the first direction is supported so as to be rotatable about a rotation axis A1 extending in the first direction. In addition, the first bearing 60 is rotatable about the developing roller shaft 32 with respect to the casing 10. More specifically, the second end portion 62 is pivotable about the rotation axis A1 with respect to the first end portion 61.

The first bearing 60 serves as an electrically conductive member which, because it provides electrical connection to the developing roller shaft 32, is described herein as a developing electrode. The first bearing 60 is made of, for example, a conductive resin. However, the first bearing 60 may be made of metal. The first end portion 61 of the first bearing 60 is in contact with the one end portion of the developing roller shaft 32 in the first direction. Consequently, the first end portion 61 of the first bearing 60 is electrically connected to the developing roller shaft 32.

In addition, the first bearing 60 has a first hole 67. The first hole 67 is located in the second direction between the first end portion 61 and the second end portion 62. Furthermore, the first hole 67 passes completely through the first bearing 60 in a pivotal direction about the rotation axis A1. However, the first hole 67 need not pass completely through the first bearing 60. The other end portion 112 of the first lever 110 (described below) is inserted into the first hole 67.

The first lever 110 is located at the first outer surface 11 of the casing 10. As illustrated in FIG. 4, the first lever 110 has one end portion 111, the other end portion 112, and a portion 113 having a pivot surface and configured to function as a pivot point 113, the portion 113 having the form/shape of a cam and herein referred to as a cam surface 113. The one end portion 111 is located at one end 110*a* of the first lever 110 in a third direction crossing the first direction and the second direction. The other end portion 112 is located at the other end 110*b* of the first lever 110 in the third direction. The cam surface 113 is located between the one end portion 111 and the other end portion 112 in the third direction. In addition, the one end portion 111 of the first lever 110 includes a first protruding portion 114 herein referred to as a first convex portion 114. The first convex portion 114 protrudes from the one end portion 111 of the first lever 110 in the first direction. The other end portion 112 of the first lever 110 includes a second protruding portion 115 herein referred to as a second convex portion 115. The second convex portion 115 protrudes from the other end portion 112 of the first lever 110 in the first direction.

The first lever 110 is movable relative to the casing 10. When the developing cartridge 1 is being mounted on the drum cartridge 2, the cam surface 113 can be brought into contact with a drum frame 91 (described below) of the drum cartridge 2. The first lever 110 is pivotable about the cam surface 113 between a first position and a second position.

The other end portion 112 of the first lever 110 is inserted into the first hole 67 of the first bearing 60. In addition, the other end portion 112 of the first lever 110 engages with the inner surface of the first hole 67 of the first bearing 60. More specifically, the first bearing 60 has an engagement surface 69 (refer to FIG. 11) on the inner surface of the first hole 67. The engagement surface 69 and the second convex portion 115 of the first lever 110 face each other in the third direction. That is, the second convex portion 115 of the first lever 110 engages with the engagement surface 69 of the first bearing 60. As a result, the first lever 110 is prevented from coming off from the first bearing 60 to one side in the third direction. In addition, the pivot range of the first bearing 60 about the rotation axis A1 is restricted.

The holder 120 is located at the first outer surface 11 of the casing 10. The holder 120 is fixed to the first outer surface 11 of the casing 10 by, for example, screwing. A portion of the first lever 110 is located between the first outer surface 11 and the holder 120. The first convex portion 114 of the first lever 110 is located closer to the one side 3*a* in the third direction than the holder 120 is to the one side 3*a* in the third direction. The second convex portion 115 of the first lever 110 is located closer to the other side 3*b* of the holder 120 in the third direction than the holder 120 is to the other side 38 of the holder 120 in the third direction. The first convex portion 114 and the holder 120 face each other in the third direction. Thus, the first lever 110 is prevented from coming off the holder 120 toward the other side 3B in the third direction. That is, the holder 120 holds the first lever 110 such that the first lever 110 is movable with respect to the casing 10.

The second bearing 70 is located at the second outer surface 12 of the casing 10. More specifically, the second bearing 70 is located at the outer surface of the gear cover 53. The first bearing 60 and the second bearing 70 are located so as to overlap each other, as viewed in the first direction. The second bearing 70 rotatably supports the other end portion of the developing roller shaft 32 in the first direction. As illustrated in FIG. 5, the second bearing 70 has a third end portion 71 and a fourth end portion 72. The fourth end portion 72 is farther away from the developing roller shaft 32 than the third end portion 71. In addition, the fourth end portion 72 is farther away in the second direction from the one end 10*a* of the casing 10 in the second direction than the third end portion 71 is from the one end 10*a* of the casing 10 in the second direction. The second bearing 70 extends along the second outer surface 12 of the casing 10 between the third end portion 71 and the fourth end portion 72.

The second bearing 70 includes a third arm 73 and a fourth arm 74. The fourth arm 74 is farther away from the developing roller shaft 32 than the third arm 73. In addition, the fourth arm 74 is farther away in the second direction from the one end 10*a* of the casing 10 in the second direction than the third arm 73 is from the one end 10*a* of the casing 10 in the second direction. The third arm 73 has the third end portion 71 described above. The fourth arm 74 has the fourth end portion 72 described above. The third arm 73 extends along the second outer surface 12 of the casing 10, for example, linearly. The fourth arm 74 extends along the second outer surface 12 of the casing 10, for example, linearly. However, the third arm 73 is at an angle to the fourth arm 74. The angle formed by the third arm 73 and the fourth arm 74 is an obtuse angle.

According to the present embodiment, the third arm 73 and the fourth arm 74 are integrally formed. However, the third arm 73 and the fourth arm 74 may be separate parts. In this case, it is only required that the third arm 73 and the fourth arm 74 are fixed to each other.

The second bearing 70 has a second insertion hole 75. The second insertion hole 75 extends in the first direction in the third end portion 71 of the second bearing 70. The second insertion hole 75 may be a through-hole passing through the third end portion 71 in the first direction. Alternatively, the second insertion hole 75 may be a hole that does not pass through the third end portion 71. The second insertion hole 75 has a cylindrical inner circumferential surface. The other end portion of the developing roller shaft 32 in the first direction is inserted into the second insertion hole 75. In this manner, the second bearing 70 is attached to the other end portion of the developing roller shaft 32 in the first direction. Thus, the other end portion of the developing roller shaft 32 in the first direction is supported so as to be rotatable about a rotation axis A1 extending in the first direction. In addition, the second bearing 70 is also rotatable about the developing roller shaft 32 with respect to the casing 10. More specifically, the fourth end portion 72 is rotatable about the rotation axis A1 with respect to the third end portion 71.

In addition, the second bearing 70 has a third hole 77. The third hole 77 extends in the second direction between the third end portion 71 and the fourth end portion 72. Furthermore, the third hole 77 passes completely through the second bearing 70 in a pivotal direction about the rotation axis A1. However, the third hole 77 need not pass completely through the second bearing 70. The other end portion 132 of the second lever 130 (described below) is inserted into the third hole 77. The first hole 67 of the first bearing 60 and the third hole 77 of the second bearing 70 are located so as to overlap each other, as viewed in the first direction.

The second lever 130 is located at the second outer surface 12 of the casing 10. More specifically, the second bearing 70 is located at the outer surface of the gear cover 53. As illustrated in FIG. 5, the second lever 130 has one end portion 131, the other end portion 132, and a portion 133 having a pivot surface and configured to function as a pivot point 133, the portion 133 having the form/shape of a cam and herein referred to as a cam surface 133. The one end portion 131 is located at one end 130*a* of the second lever 130 in the third direction. The other end portion 132 is located at the other end 130*b* of the second lever 130 in the third direction. The cam surface 133 is located between the one end portion 131 and the other end portion 132 in the third direction. Furthermore, the other end portion 132 of the second lever 130 includes a third protruding portion 135 herein referred to as a third convex portion 135. The third convex portion 135 protrudes from the other end portion 132 of the second lever 130 in the first direction.

The one end portion 111 of the first lever 110 and the one end portion 131 of the second lever 130 are located so as to overlap each other, as viewed in the first direction. The other end portion 112 of the first lever 110 and the other end portion 132 of the second lever 130 are located so as to overlap each other, as viewed in the first direction.

The second lever 130 is movable relative to the casing 10. When the developing cartridge 1 is being mounted on the drum cartridge 2, the cam surface 133 can be in contact with a drum frame 91 (described below) of the drum cartridge 2. The second lever 130 is pivotable with respect to the cam surface 133 between a third position and a fourth position.

The other end portion 132 of the second lever 130 is inserted into the third hole 77 of the second bearing 70. In addition, the other end portion 132 of the second lever 130 engages with the inner surface of the third hole 77 of the second bearing 70. More specifically, the second bearing 70 has an engagement surface (not illustrated) in the inner surface of the third hole 77. The engagement surface and the third convex portion 135 of the second lever 130 face each other in the third direction. That is, the third convex portion 135 of the second lever 130 engages with the engagement surface of the second bearing 70. As a result, the second lever 130 is prevented from coming off the second bearing 70 to the one side 3*a* in the third direction. Furthermore, the rotation range of the second bearing 70 about the rotation axis A1 is restricted.

As illustrated in FIG. 5, the gear cover 53 has a protrusion 532 protruding in the first direction and having a convex form/shape and herein referred to as a gear cover convex portion 532 protruding in the first direction. The second lever 130 is located between the collar 531 and the gear cover convex portion 532 of the gear cover 53 in the second direction. In this manner, the movement of the second lever 130 in the second direction is restricted. In addition, the second lever 130 extends in an arc along the outer peripheral surface of the collar 531 of the gear cover 53. A portion of the collar 531 is located between the one end portion 131 and the other end portion 132 of the second lever 130 in the third direction. In this manner, the movement of the second lever 130 in the third direction is restricted.

<1-3. Structure of Drum Cartridge>

As illustrated in FIG. 1, the drum cartridge 2 includes the drum frame 91 and the photosensitive drum 92. The developing cartridge 1 is mounted on the drum frame 91. The photosensitive drum 92 is a cylindrical drum which is rotatable about a rotation axis extending in the first direction. The outer peripheral surface of the photosensitive drum 92 is coated with a photosensitive material. The photosensitive drum 92 is located at one end of the drum frame 91 in the second direction. When the developing cartridge 1 is being mounted on the drum frame 91, the outer peripheral surface of the developing roller 30 is in contact with the outer peripheral surface of the photosensitive drum 92.

Figure 6:
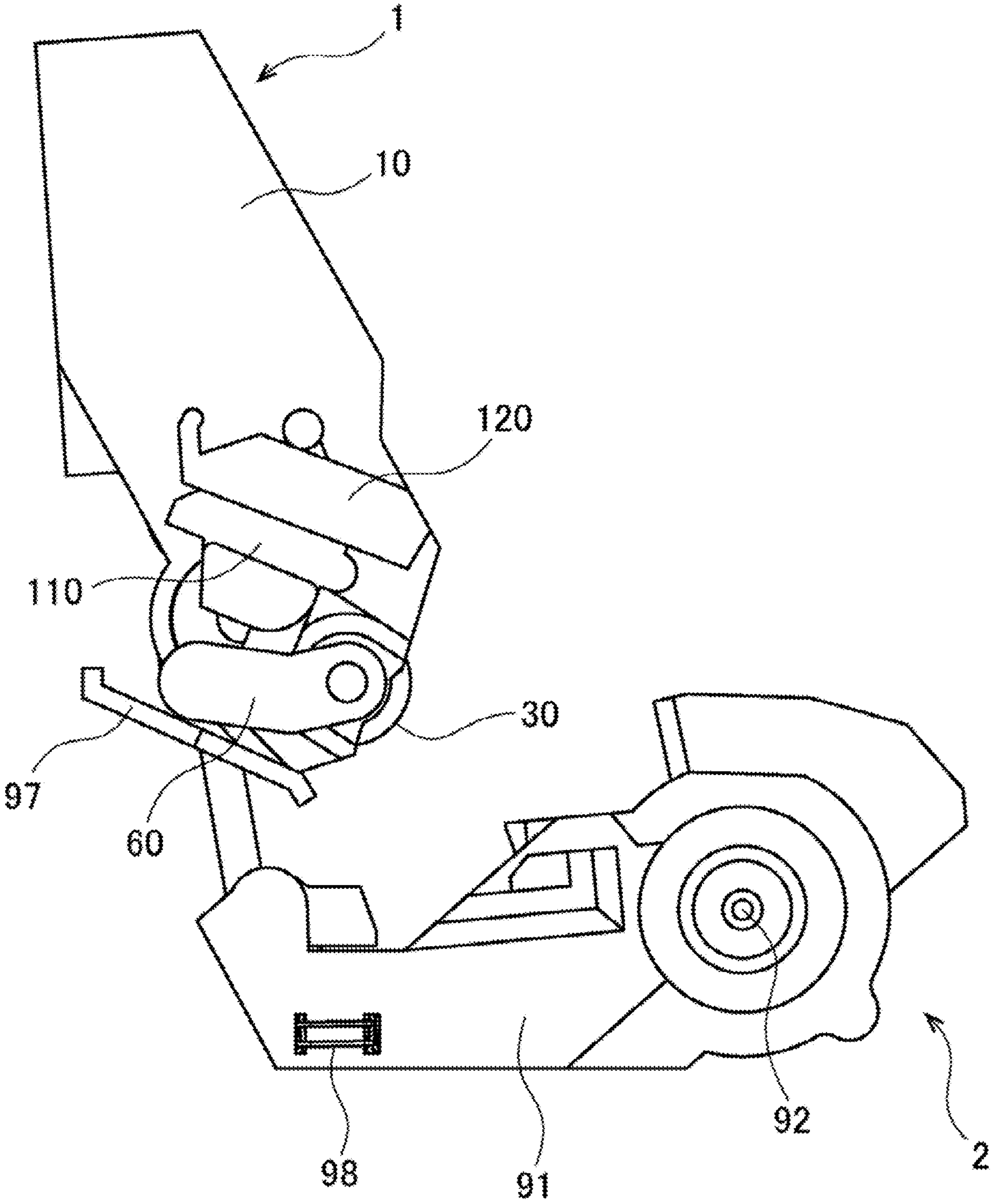
FIG. 6 is a view of the developing cartridge being mounted on the drum cartridge as viewed from one side of a first direction in the first embodiment.
Figure 7:
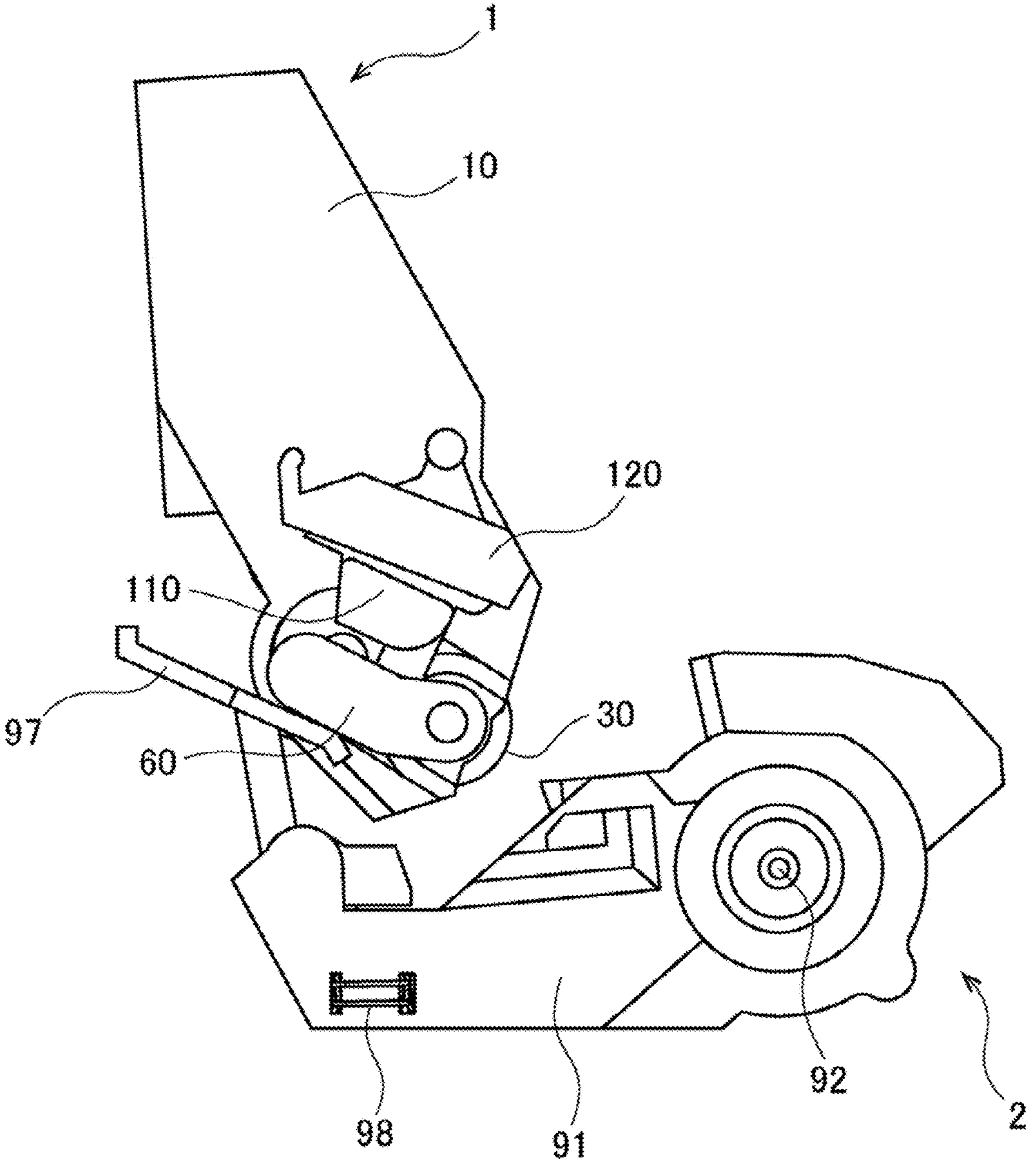
FIG. 7 is a view of the developing cartridge being mounted on the drum cartridge as viewed from the one side of the first direction in the first embodiment.
Figure 8:
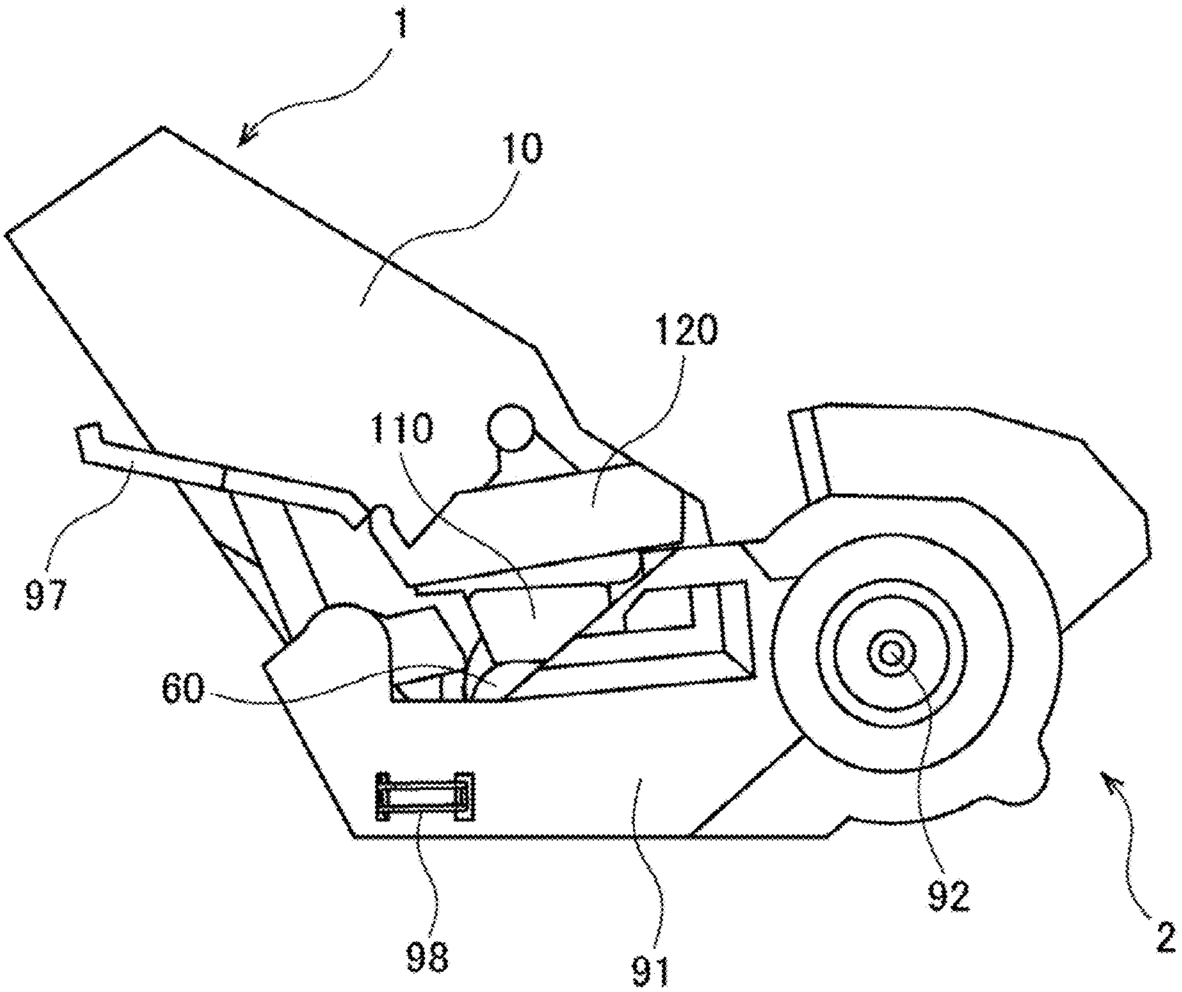
FIG. 8 is a view of the developing cartridge being mounted on the drum cartridge as viewed from the one side of the first direction in the first embodiment.
Figure 9:
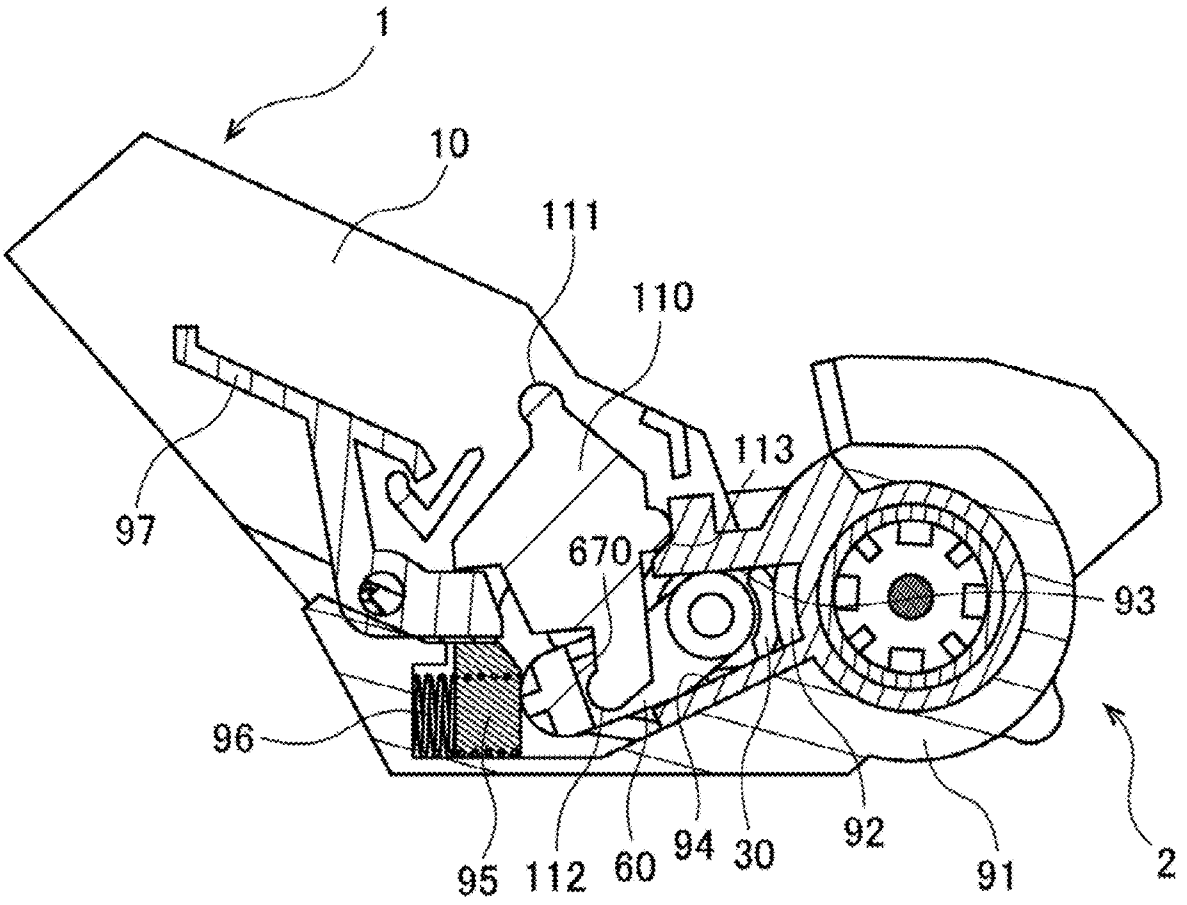
FIG. 9 is a cross-sectional view of the developing cartridge and the drum cartridge after the developing cartridge is mounted on the drum cartridge in the first embodiment.

FIGS. 6 to 8 are views of the developing cartridge 1 being mounted on the drum cartridge 2 as viewed from one side in the first direction. FIG. 9 is a cross-sectional view of the developing cartridge 1 and the drum cartridge 2 after the developing cartridge 1 is mounted on the drum cartridge 2. Note that FIG. 9 is a cross section that is orthogonal to the first direction and that passes completely through the first bearing 60 and the first lever 110.

As illustrated in FIG. 9, the drum cartridge 2 has a first guide surface 93 and a second guide surface 94. The first guide surface 93 and the second guide surface 94 are located at one end of the drum frame 91 in the first direction. In addition, the first guide surface 93 and the second guide surface 94 are separated in the rotational direction about the rotation axis of the photosensitive drum 92. Note that the drum cartridge 2 further has a third guide surface (not illustrated) and a fourth guide surface (not illustrated) that are similar to the first guide surface 93 and the second guide surface 94, respectively, at the other end of the drum frame 91 in the first direction.

Furthermore, as illustrated in FIG. 9, the drum cartridge 2 includes a first pressing member 95 and a first coil spring 96. The first pressing member 95 and the first coil spring 96 are electrically conductive. The first pressing member 95 is made of, for example, a conductive resin. The first coil spring 96 is made of, for example, metal. The first pressing member 95 and the first coil spring 96 are located at one end of the drum frame 91 in the first direction. The first coil spring 96 is a resilient member that can expand and contract in the second direction. One end of the first coil spring 96 in the second direction is connected to the first pressing member 95. The other end of the first coil spring 96 in the second direction is connected to the drum frame 91. When the developing cartridge 1 is mounted on the drum cartridge 2, the first pressing member 95 presses the second end portion 62 of the first bearing 60 toward the photosensitive drum 92 by the resilience force of the first coil spring 96.

In addition, the drum cartridge 2 includes a second pressing member (not illustrated) and a second coil spring (not illustrated). The second pressing member and the second coil spring are located at the other end 91B of the drum frame 91 in the first direction. When the developing cartridge 1 is mounted on the drum cartridge 2, the second pressing member presses the fourth end portion 72 of the second bearing 70 toward the photosensitive drum 92 by the resilience force of the second coil spring.

Note that instead of using the first coil spring 96 and the second coil spring, other types of resilient members may be used for the drum cartridge 2. For example, the drum cartridge 2 may be provided with a spring other than a coil spring (e.g., a torsion spring or a leaf spring), rubber, or the like) as the resilient member.

In addition, as illustrated in FIGS. 6 to 9, the drum cartridge 2 includes a first release lever 97. The first release lever 97 is located at the one end 91A of the drum frame 91 in the first direction. The first release lever 97 is pivotable about a shaft extending in the first direction. The drum cartridge 2 further includes a second release lever (not illustrated). The second release lever is located at the other end 91B in the first direction of the drum frame 91. The second release lever is pivotable about a rotation shaft extending in the first direction.

<1-4. Information about Operation to Mount Development Cartridge>

As illustrated in FIGS. 6 to 9, when the developing cartridge 1 is being mounted on the drum cartridge 2, the developing cartridge 1 is moved relative to the drum cartridge 2 so that the developing roller 30 moves close to the photosensitive drum 92. At this time, as illustrated in FIGS. 6 to 9, the second end portion 62 of the first bearing 60 is brought into contact with the first release lever 97 and moves along the first release lever 97. Accordingly, the first bearing 60 pivots about the rotation axis A1. Similarly, the third end portion 71 of the second bearing 70 is brought into contact with the second release lever and moves along the second release lever. Accordingly, the second bearing 70 pivots about the rotation axis A1.

As described above, when the developing cartridge 1 is being mounted on the drum cartridge 2, the first bearing 60 and the second bearing 70 pivot about the rotation axis A1 of the developing roller 30. As a result, without rotating the casing 10 with respect to the drum frame 91, the first bearing 60 can be placed between the photosensitive drum 92 and the first pressing member 95. In addition, the second bearing 70 can be placed between the photosensitive drum 92 and the second pressing member. Consequently, a user of the image forming apparatus can move the developing roller 30 close to the photosensitive drum 92 without performing the operation to rotate the casing 10.

When the first bearing 60 is placed between the photosensitive drum 92 and the first pressing member 95, the first pressing member 95 is in contact with the second end portion 62 of the first bearing 60. At this time, the first pressing member 95 presses the second end portion 62 of the first bearing 60 toward the photosensitive drum 92 by the resilience force of the first coil spring 96. Then, as illustrated in FIG. 9, the first end portion 61 of the first bearing 60 is brought into contact with the first guide surface 93, and the other portion of the first bearing 60 is brought into contact with the second guide surface 94. In this manner, the position of the first bearing 60 relative to the drum frame 91 is fixed.

Similarly, the second pressing member presses the fourth end portion 72 of the second bearing 70 toward the photosensitive drum 92. At this time, the third end portion 71 of the second bearing 70 is brought into contact with the third guide surface, and the other portion of the second bearing 70 is brought into contact with the fourth guide surface. In this manner, the position of the second bearing 70 relative to the drum frame 91 is fixed.

Furthermore, the first pressing member 95 presses the first bearing 60 with the positions of the first bearing 60 and the second bearing 70 relative to the drum frame 91 fixed. In addition, the second pressing member presses the second bearing 70. Thus, the outer peripheral surface of the developing roller 30 is brought into contact with the outer peripheral surface of the photosensitive drum 92. In this manner, the developing roller 30 is urged against the photosensitive drum 92.

As described above, according to the present embodiment, the first bearing 60 has the first end portion 61 and the second end portion 62, and the second end portion 62 is pivotable with respect to the first end portion 61. In addition, the second bearing 70 has the third end portion 71 and the fourth end portion 72, and the fourth end portion 72 is pivotable with respect to the third end portion 71. Consequently, the positioning of the developing roller 30 relative to the photosensitive drum 92 can be achieved by using the first end portion 61 and the second end portion 62 of the first bearing 60 and the third end portion 71 and the fourth end portion 72 of the second bearing 70.

Furthermore, according to the present embodiment, when the developing cartridge 1 is being mounted on the drum cartridge 2, the first bearing 60 and the second bearing 70 pivot about the rotation axis A1. In addition, when the developing cartridge 1 is being removed from the drum cartridge 2, the first bearing 60 and the second bearing 70 pivot about the rotation axis A1 in the same manner. For this reason, the developing cartridge 1 can be smoothly mounted on or removed from the drum cartridge 2 by causing the first bearing 60 and the second bearing 70 to pivot without rotating the casing 10.

<1-5. Information about Supply of Voltage>

The first pressing member 95 and the first coil spring 96 are electrically conductive. The first pressing member 95 is made of, for example, a conductive resin. The first coil spring 96 is made of, for example, metal. In addition, the drum cartridge 2 includes an electrode terminal 98 that is in electrical contact with the first coil spring 96. As illustrated in FIGS. 6 to 8, the electrode terminal 98 is exposed on the outer surface of the drum frame 91. Furthermore, as described above, the developing roller shaft 32 and the first bearing 60 are electrically conductive. For this reason, when the developing cartridge 1 is mounted on the drum cartridge 2 and, thus, the first pressing member 95 is brought into contact with the first bearing 60, the electrode terminal 98, the first coil spring 96, the first pressing member 95, the first bearing 60, and the developing roller shaft 32 are electrically connected to one another.

When the developing cartridge 1 mounted on the drum cartridge 2 is mounted in the image forming apparatus, the electrode terminal of the image forming apparatus is in contact with the electrode terminal 98 of the drum cartridge 2. Thus, a bias voltage is supplied from the image forming apparatus to the developing roller shaft 32 via the electrode terminal 98, the first coil spring 96, the first pressing member 95, and the first bearing 60. As a result, the developer material is attracted to the outer peripheral surface of the developing roller main body 31 by the electrostatic force generated by the bias voltage.

As described above, according to the present embodiment, the bias voltage is supplied to the first bearing 60 of the developing cartridge 1 via the first pressing member 95 of the drum cartridge 2. In this way, the number of parts of the drum cartridge 2 can be reduced as compared with the case where a conductive part for supplying a voltage to the first bearing 60 is provided separately from the first pressing member 95. Therefore, the size of the drum cartridge 2 can be reduced.

In addition, the first bearing 60 according to the present embodiment has (1) the capability of serving as a bearing for rotatably supporting the developing roller shaft 32 and (2) the capability of serving as a positioning member that determines the position of the developing roller 30 relative to the photosensitive drum 92 when the developing cartridge 1 is mounted on the drum cartridge 2 and (3) the capability of serving as a developing electrode for supplying a bias voltage to the developing roller shaft 32. For this reason, the number of parts in the developing cartridge 1 can be reduced as compared with the case where these capabilities are provided by using different members. In addition, the size of the developing cartridge 1 can be reduced.

<1-6. Information about Separating Operation>

After the developing cartridge 1 mounted on the drum cartridge 2 is mounted in the image forming apparatus, the developing cartridge 1 can perform a separating operation by the driving force supplied from the image forming apparatus. As used herein, the term "separating operation" refers to an operation to temporarily separate the developing roller 30 from the photosensitive drum 92. For example, when monochrome printing is performed in the image forming apparatus, the developing cartridges 1 of colors other than black perform the separating operation. Note that the developing cartridge 1 of black color may perform the separating operation.

As illustrated in FIG. 9, with the developing cartridge 1 mounted on the drum cartridge 2, the developing cartridge 1 is placed at a contact position at which the developing roller 30 is in contact with the photosensitive drum 92. At this time, the position of the first lever 110 is the first position. At the first position, the other end portion 112 of the first lever 110 is separated from the inner surface 670 of the first hole 67 of the first bearing 60. Consequently, the other end portion 112 of the first lever 110 does not press the inner surface 670 of the first hole 67. In addition, the cam surface 113 of the first lever 110 is in contact with the drum frame 91. Furthermore, the position of the second lever 130 at this time is the third position. At the third position, the other end portion 132 of the second lever 130 is separated from the inner surface of the third hole 77 of the second bearing 70. Consequently, the other end portion 132 of the second lever 130 does not press the inner surface of the third hole 77 of the second bearing 70. In addition, the cam surface 133 of the second lever 130 is in contact with the drum frame 91.

Figure 10:
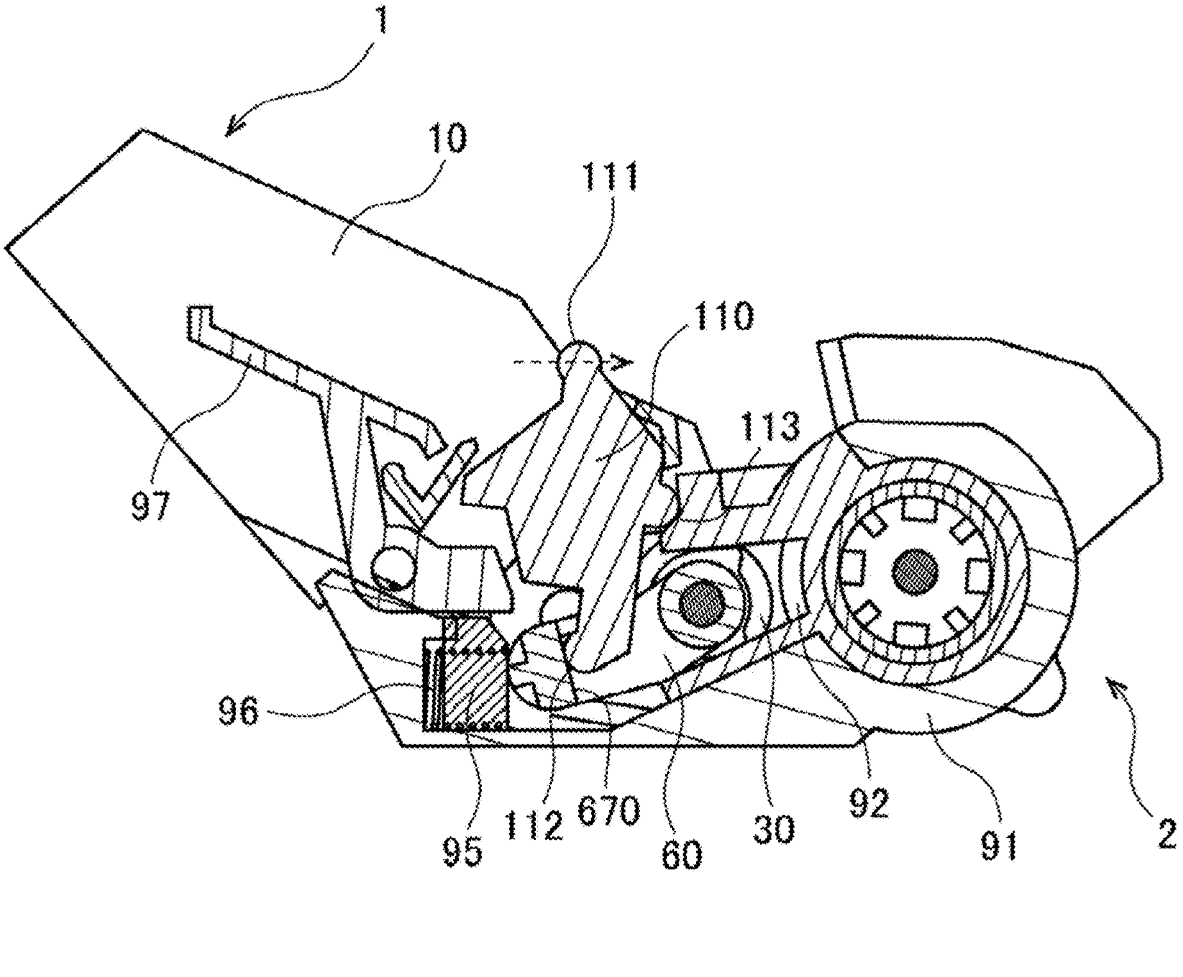
FIG. 10 is a cross-sectional view of the developing cartridge and the drum cartridge when the developing cartridge is in a separation operation in the first embodiment.

FIG. 10 is a cross-sectional view of the developing cartridge 1 and the drum cartridge 2 at the time of the separating operation. Note that FIG. 10 is the cross section that is orthogonal to the first direction and that passes completely through the first bearing 60 and the first lever 110.

The image forming apparatus applies a driving force to the one end portion 111 of the first lever 110 when the separating operation is performed. More specifically, the image forming apparatus operates a drive lever (not illustrated). Then, the drive lever presses the one end portion 111 of the first lever 110 as indicated by a broken arrow in FIG. 10. Thus, the first lever 110 pivots about the cam surface 133 from the first position to the second position. At this time, the other end portion 112 of the first lever 110 moves in a direction away from the photosensitive drum 92 and presses the inner surface 670 of the first hole 67 of the first bearing 60. More specifically, the other end portion 112 of the first lever 110 presses the second end portion 62 of the first bearing 60 in a direction away from the developing roller 30 against the pressing force of the first pressing member 95. As a result, the first bearing 60 moves in the direction away from the photosensitive drum 92 together with the other end portion 112 of the first lever 110.

In addition, the image forming apparatus applies a driving force to one end portion 131 of the second lever 130 when the separating operation is performed. More specifically, the image forming apparatus operates another drive lever (not illustrated). Then, the drive lever presses the one end portion 131 of the second lever 130. Thus, the second lever 130 pivots about the cam surface 133 from the third position to the fourth position. At this time, the other end portion 132 of the second lever 130 moves in the direction away from the photosensitive drum 92 and presses the inner surface of the third hole 77 of the second bearing 70. More specifically, the other end portion 132 of the second lever 130 presses the fourth end portion 72 of the second bearing 70 in a direction away from the developing roller 30 against the pressing force of the second pressing member. As a result, the second bearing 70 moves in the direction away from the photosensitive drum 92 together with the other end portion 132 of the second lever 130.

Thus, the casing 10 and the developing roller 30 move in the direction away from the photosensitive drum 92 together with the first bearing 60 and the second bearing 70. As a result, the outer peripheral surface of the developing roller 30 is separated from the outer peripheral surface of the photosensitive drum 92. That is, the developing cartridge 1 moves from the above-described contact position to the separated position with respect to the drum cartridge 2.

As described above, according to the present embodiment, the other end portion 112 of the first lever 110 presses the inner surface 670 of the first hole 67 of the first bearing 60 in accordance with the force that the one end portion 111 of the first lever 110 receives from the drive lever of the image forming apparatus. In this manner, the force can be applied to move the developing cartridge 1 from the contact position to the separated position. That is, the driving force applied by the image forming apparatus can be transmitted to the first bearing 60 by the first lever 110 having the one end portion 111 that functions as the point of effort, the other end portion 112 that functions as the point of application, and the cam surface 113 that functions as the pivot point.

Furthermore, the other end portion 132 of the second lever 130 presses the inner surface of the third hole 77 of the second bearing 70 in accordance with the force that the one end portion 131 of the second lever 130 receives from the drive lever of the image forming apparatus. In this manner, the force can be applied to move the developing cartridge 1 from the contact position to the separated position. That is, the driving force applied by the image forming apparatus can be transmitted to the second bearing 70 by the second lever 130 having the one end portion 131 that functions as the point of effort, the other end portion 132 that functions as the point of application, and the cam surface 133 that functions as the pivot point.

That is, the driving force supplied by the image forming apparatus is transmitted to the first bearing 60 and the second bearing 70 of the developing cartridge 1 without passing through the drum cartridge 2. In this manner, the need for providing, in the drum cartridge 2, a component that relays the driving force is eliminated. Consequently, the number of parts of the drum cartridge 2 can be reduced. As a result, the size of the drum cartridge 2 can be reduced.

In addition, in the developing cartridge 1, the one end portion 111 of the first lever 110 includes the first convex portion 114 that protrudes in the first direction. For this reason, the surface area of the one end portion 111 of the first lever 110 is wider than in the case where the first convex portion 114 is not provided. Therefore, at the time of the separating operation, the drive lever of the image forming apparatus can stably press the one end portion 111 of the first lever 110. In this manner, the separating operation performed in the image forming apparatus is stabilized. Note that like the first lever 110, the one end portion 131 of the second lever 130 may have a convex portion that protrudes in the first direction.

In addition, in the developing cartridge 1, the first bearing 60 and the second bearing 70 which support the developing roller shaft 32 receive a pressing force at the time of the separating operation. Consequently, the number of parts in the developing cartridge 1 can be reduced as compared with the case where a member that receives a pressing force at the time of the separating operation is provided separately from the first bearing 60 and the second bearing 70. As a result, the size of the developing cartridge 1 can be reduced.

In addition, the first bearing 60 is pivotable about the rotation axis A1. Therefore, the first lever 110 can press the inner surface 670 of the first hole 67 of the first bearing 60 in an optimum direction. Similarly, the second bearing 70 is pivotable about the rotation axis A1. Therefore, the second lever 130 can press the inner surface of the third hole 77 of the second bearing 70 in an optimum direction.

In addition, when the developing cartridge 1 moves from the contact position to the separated position, the first bearing 60 moves along the second guide surface 94. Furthermore, the second bearing 70 moves along the fourth guide surface. In this manner, the first lever 110 can press the first bearing 60 while maintaining the position of the first bearing 60 relative to the rotation axis A1 serving as the central point. Furthermore, the second lever 130 can press the second bearing 70 while maintaining the position of the second bearing 70 relative to the rotation axis A1 serving as the central point.

<1-7. Operation to Remove Developing Cartridge>

Figure 11:
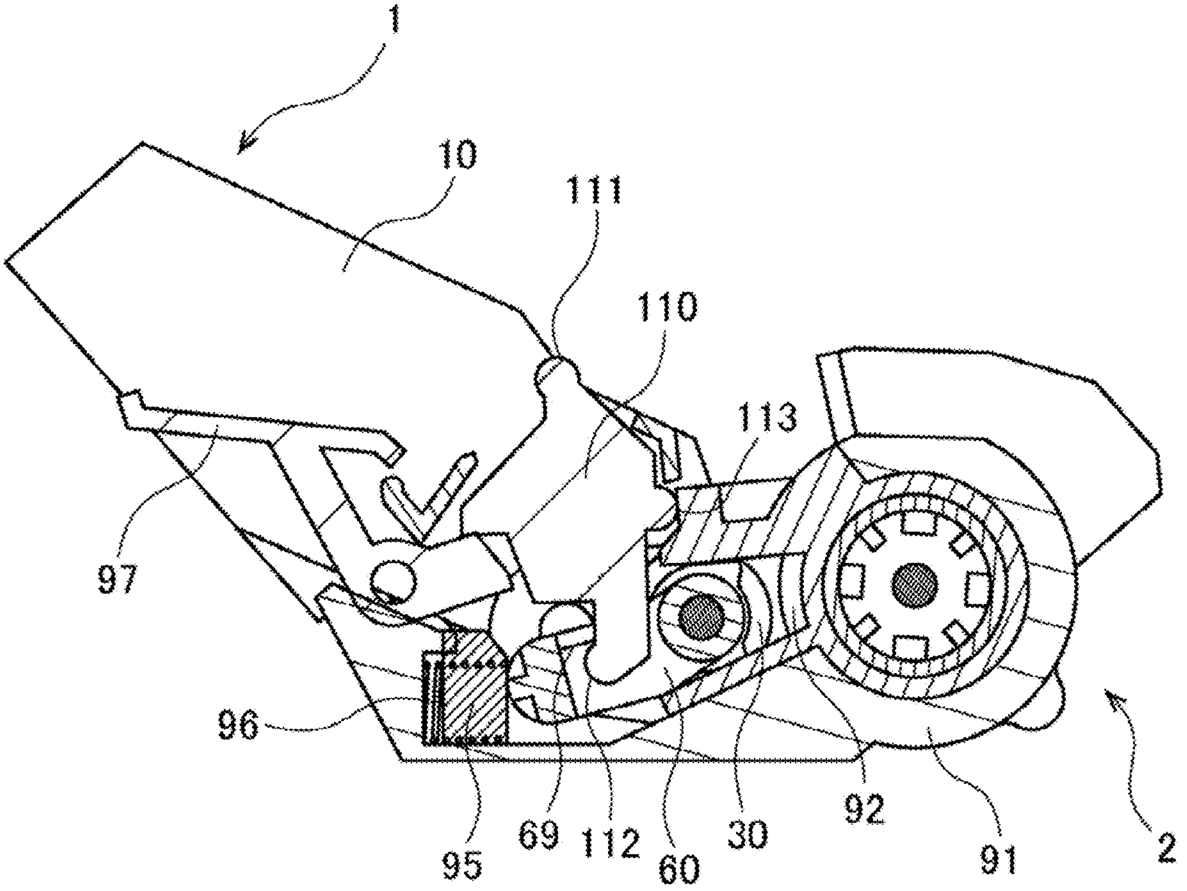
FIG. 11 is a cross-sectional view of the developing cartridge and the drum cartridge when the developing cartridge is removed from the drum cartridge in the first embodiment.

FIG. 11 is a cross-sectional view of the developing cartridge 1 and the drum cartridge 2 when the developing cartridge 1 is to be removed from the drum cartridge 2. FIG. 11 is the cross section that is orthogonal to the first direction and that passes completely through the first bearing 60 and the first lever 110.

When removing the developing cartridge 1 from the drum cartridge 2, the user presses the first release lever 97 and the second release lever. Thus, the first release lever 97 and the second release lever pivot about an axis extending in the first direction. Then, the first release lever 97 presses the first lever 110 to the one side 3*a* in the third direction. In addition, the second release lever presses the second lever 130 to the one side 3*a* in the third direction. Furthermore, the other end portion 112 of the first lever 110 is brought into contact with the engagement surface 69 of the first bearing 60 and presses the engagement surface 69 to the one side 3*a* in the third direction. Still furthermore, the other end portion 132 of the second lever 130 is brought into contact with the engagement surface 79 of the second bearing 70 and presses an engagement surface 79 to the one side 3*a* in the third direction.

Accordingly, the first bearing 60 comes off from between the photosensitive drum 92 and the first pressing member 95 to the one side 3*a* in the third direction. In addition, the second bearing 70 comes off from between the photosensitive drum 92 and the second pressing member to the one side 3*a* in the third direction. As a result, the developing cartridge 1 can be removed from the drum cartridge 2.

2. Second Embodiment

<2-1. Overview of Developer Cartridge and Drum Cartridge>

Figure 12:
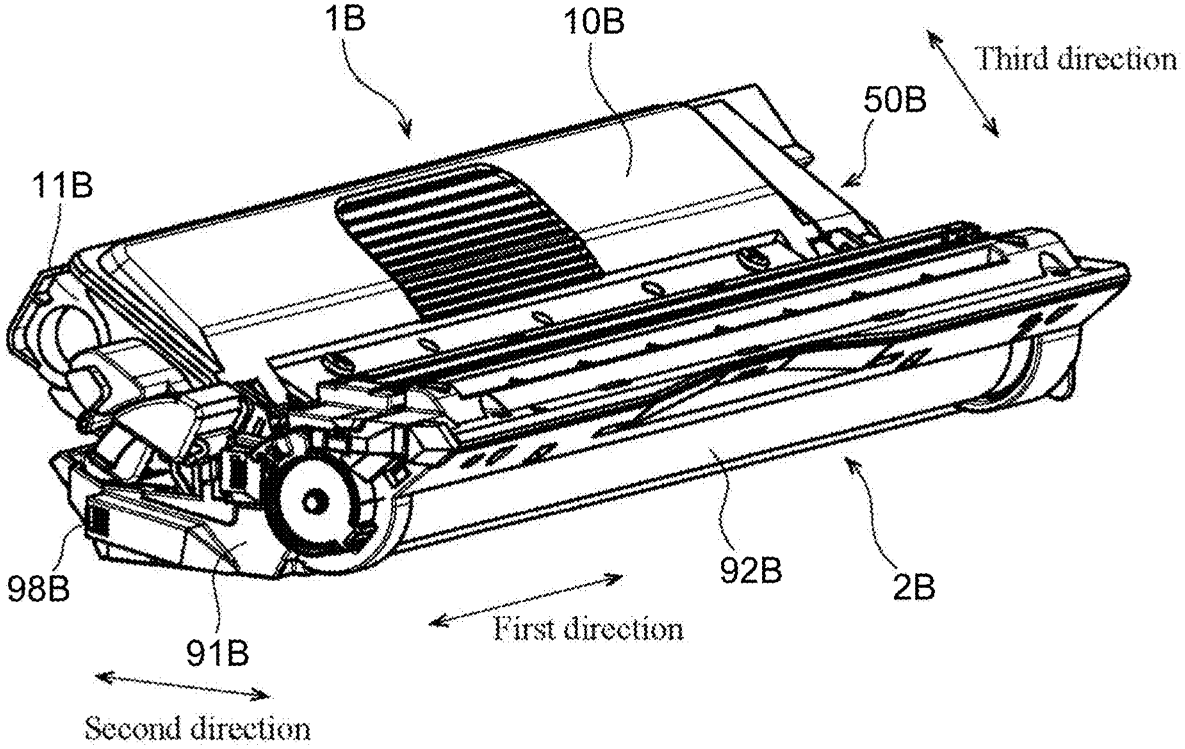
FIG. 12 is a perspective view of a developing cartridge and a drum cartridge in a second embodiment.
Figure 13:
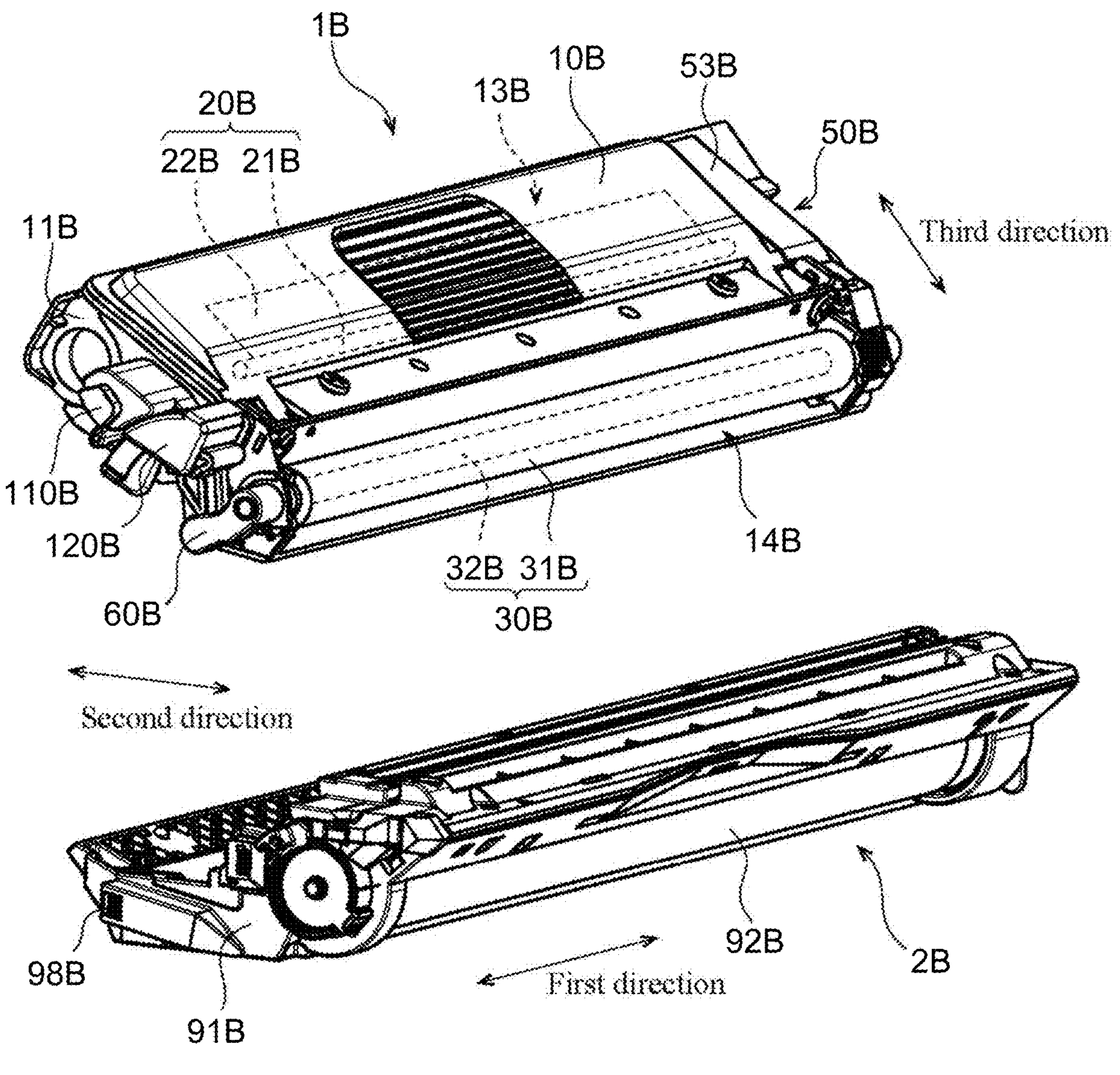
FIG. 13 is a perspective view of a developing cartridge and a drum cartridge in the second embodiment.
Figure 14:
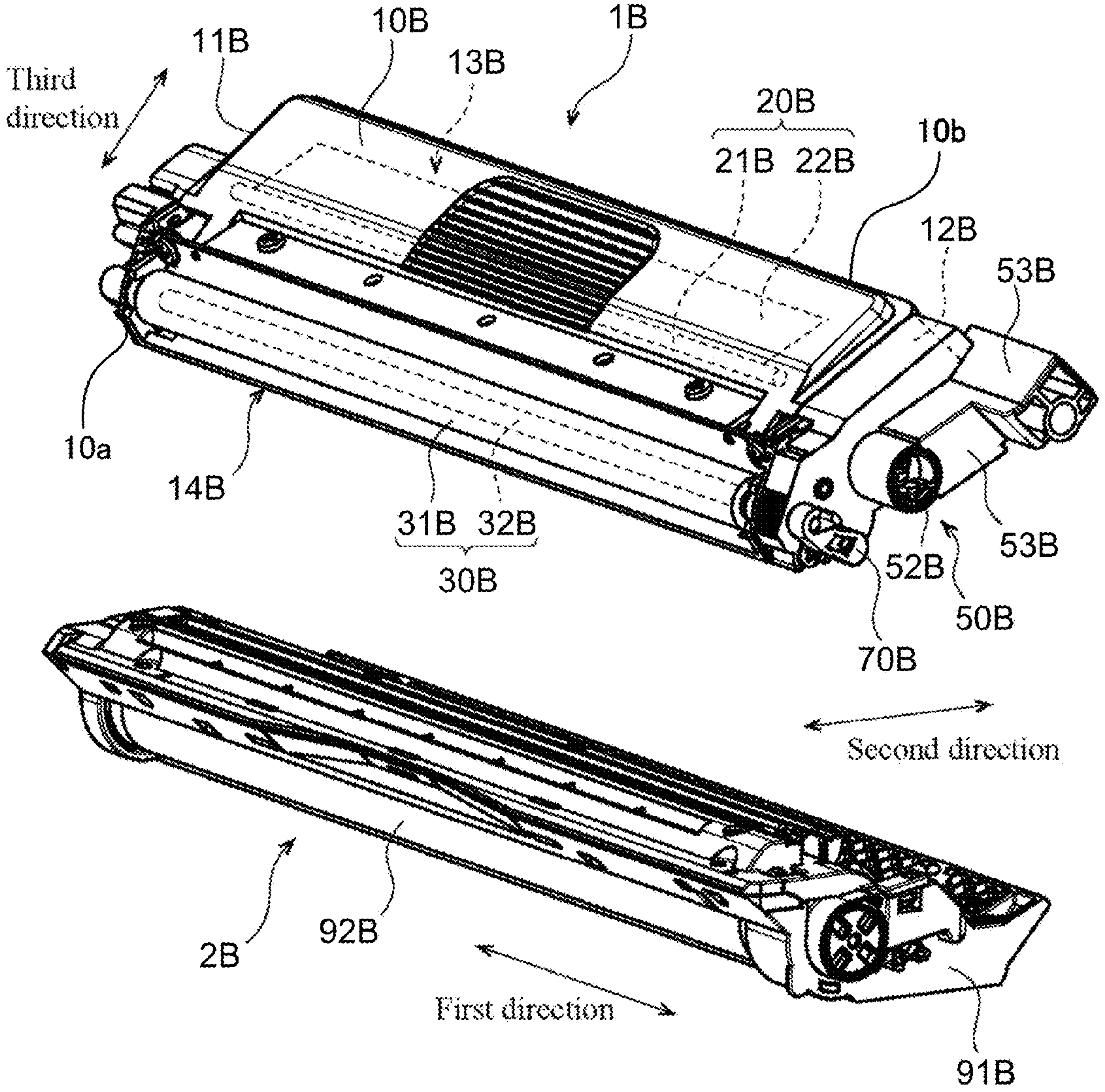
FIG. 14 is a perspective view of a developing cartridge and a drum cartridge in the second embodiment.

FIGS. 12, 13 and 14 are a perspective view of the developing cartridge 1B and the drum cartridge 2B. In FIG. 12, the developing cartridge 1B is mounted on the drum cartridge 2B. In FIGS. 13 and 14, the developing cartridge 1B is not mounted on the drum cartridge 2B. The developing cartridge 1B and the drum cartridge 2B are used in an electro-photographic image forming apparatus. An example of the image forming apparatus is a laser printer or an LED printer.

As illustrated in FIGS. 12, 13 and 14, the developing cartridge 1B is used together with the drum cartridge 2B. The developing cartridge 1B is mountable on the drum cartridge 2B. The developing cartridge 1B is mounted on the drum cartridge 2B and, thereafter, is mounted in the image forming apparatus. The image forming apparatus allows, for example, four developing cartridges 1B to be mounted therein. The four developing cartridges 1B contain developer materials (for example, toner) of different colors (for example, cyan, magenta, yellow, and black). The image forming apparatus forms an image on a recording surface of print paper by using the developer materials supplied from the developing cartridges 1B. Note that the number of developing cartridges 1B mountable in the image forming apparatus may be one or more and so, in addition to being four, may be one to three, or five or more.

<2-2. Information about Developing Cartridge>

Figure 15:
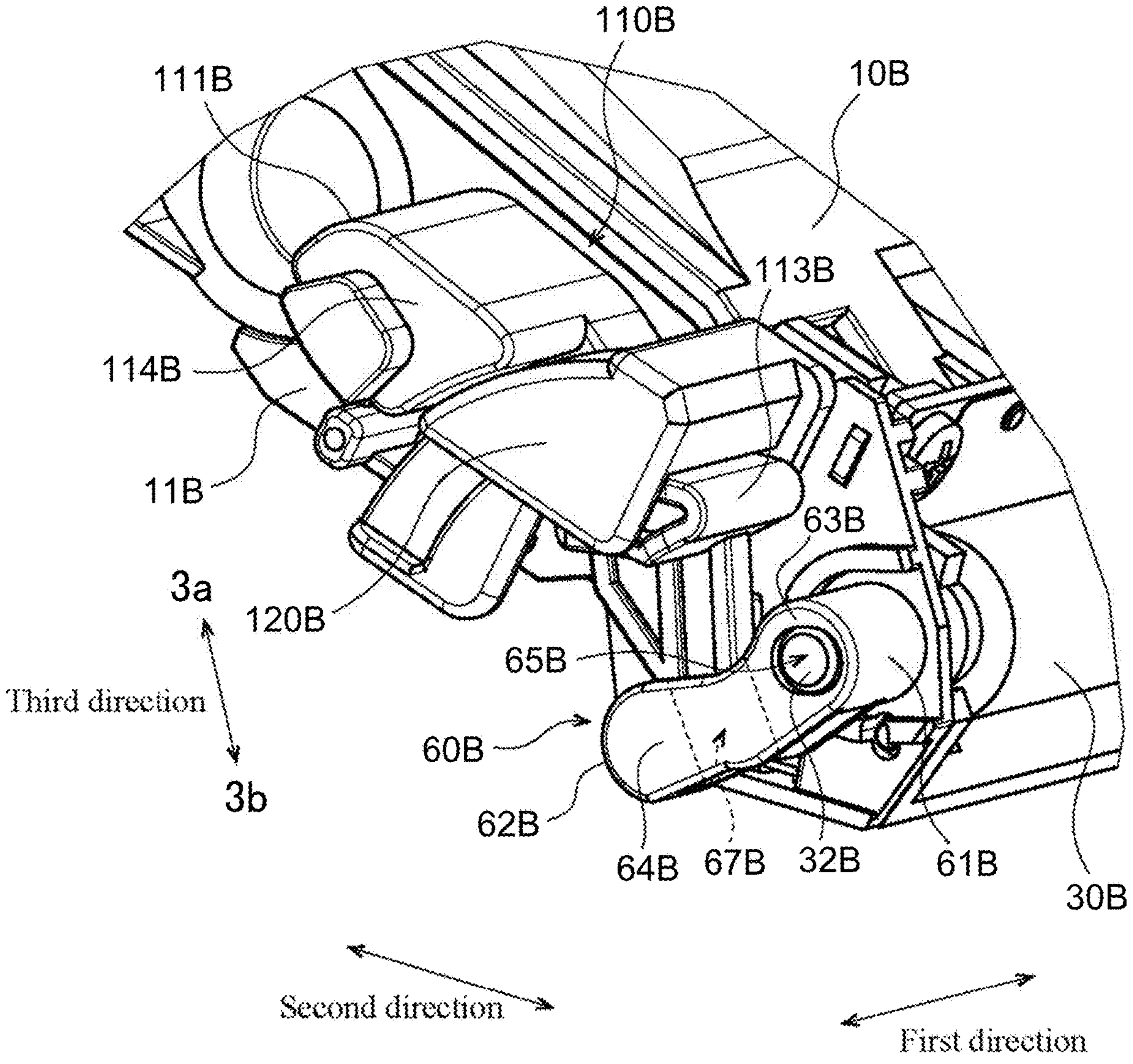
FIG. 15 is a perspective view of a portion of the developing cartridge in the vicinity of a first outer surface of a casing in the second embodiment.
Figure 16:
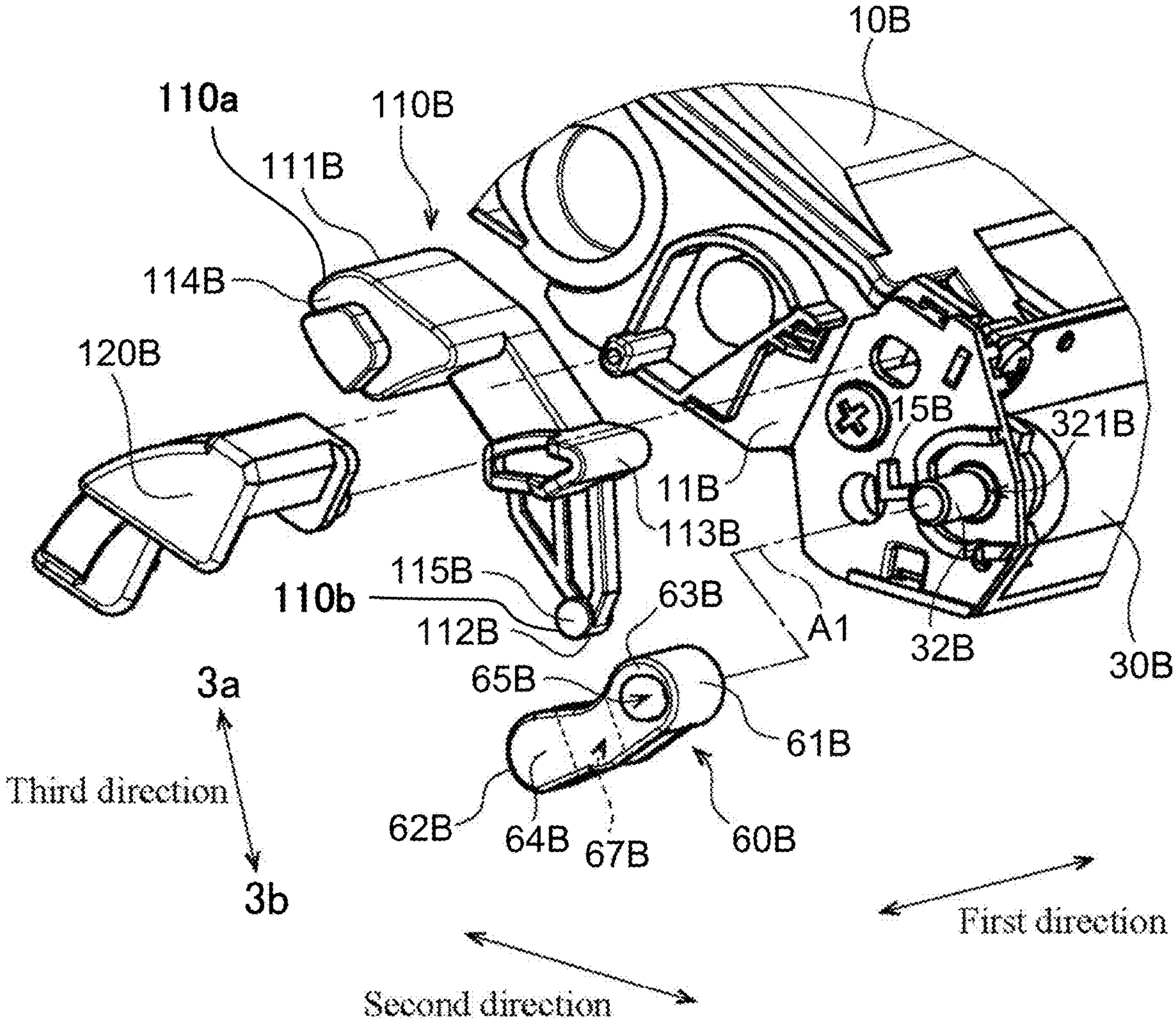
FIG. 16 is an exploded perspective view of a portion of the developing cartridge in the vicinity of a first outer surface of a casing in the second embodiment.
Figure 17:
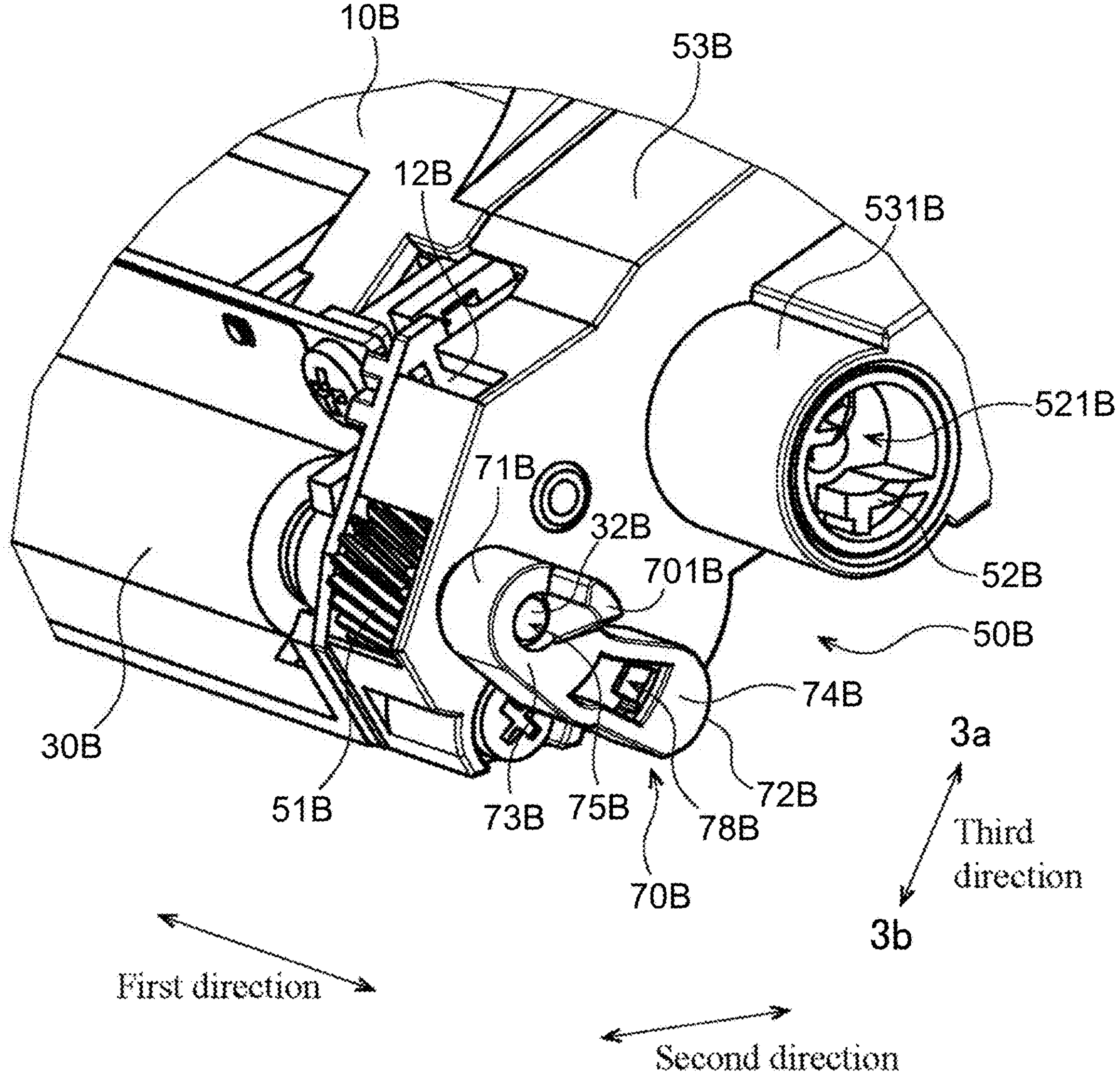
FIG. 17 is a perspective view of a portion of the developing cartridge in the vicinity of a second outer surface of a casing in the second embodiment.
Figure 18:
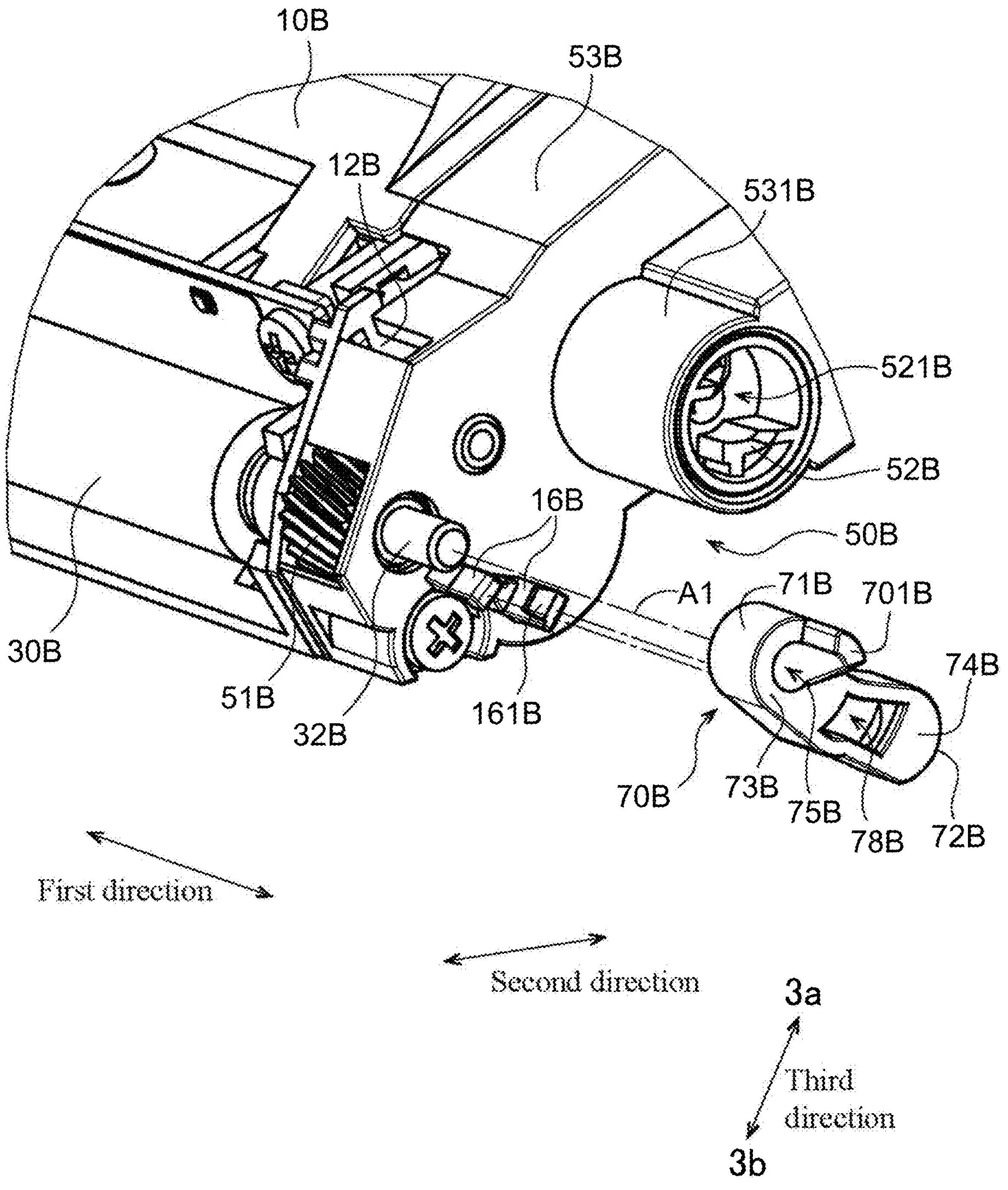
FIG. 18 is an exploded perspective view of a portion of the developing cartridge in the vicinity of a second outer surface of a casing in the second embodiment.

FIG. 15 is a perspective view of the developing cartridge 1B, in particular a perspective new in the vicinity of first outer surface 11B of a casing 10B. FIG. 16 is a view of the developing cartridge 1B, in particular an exploded perspective view in the vicinity of the first outer surface 11B of the casing 10B. FIG. 17 is a perspective view of the developing cartridge 1B, in particular a perspective new in the vicinity of first outer surface 12B of a casing 10B. FIG. 18 is a view of the developing cartridge 1B, in particular an exploded perspective view in the vicinity of the first outer surface 12B of the casing 10B.

As illustrated in FIGS. 12 to 18, the developing cartridge 1B includes the casing 10B, the agitator 20B, the developing roller 30B, a gear unit 50B, a first bearing 60B, a first lever 110B, a holder 120B, a second bearing 70B.

The casing 10B is a casing capable of containing a developer material. The casing 10B has a first outer surface 11B and a second outer surface 12B. The first outer surface 11B is located at one end of the casing 10B in the first direction. The second outer surface 12B is located at the other end of the casing 10B in the first direction. The first outer surface 11B and the second outer surface 12B are separated from each other in the first direction. The casing 10B extends in the first direction between the first outer surface 11B and the second outer surface 12B. In addition, the casing 10B extends in the second direction.

The casing 10B has an accommodation chamber 13B provided thereinside. The developer material is stored in the accommodation chamber 13B. In addition, the casing 10B has an opening 14B. The opening 14B is located at one end 10*a* of the casing 10B in the second direction. The outside of the casing 10B, in other words the external space, and the accommodation chamber 13B of the casing 10B communicate with each other through the opening 14B. Note that the casing 10B may have a handle on the outer surface at the other end 10*b* in the second direction.

The agitator 20B includes an agitator shaft 21B and a blade 22B. The agitator shaft 21B extends in the first direction. The blade 22B extends or expands from the agitator shaft 21B toward the inner surface of the casing 10B. The blade 22B and part of the agitator shaft 21B are disposed in the accommodation chamber 13B of the casing 10B. An agitator gear (not illustrated) included in the gear unit 50B is attached to one end of the agitator shaft 21B in the first direction. The agitator shaft 21B is fixed to the agitator gear so as not to rotate relative to the agitator gear. When the agitator gear rotates, the agitator shaft 21B and the blade 22B rotate about the rotation axis extending in the first direction. Thus, the developer material is agitated in the accommodation chamber 13B by the blade 22B that is rotating.

The developing roller 30B is a roller that can rotate about a rotation axis A1 extending in the first direction. The developing roller 30B is located in the opening 14B of the casing 10B. That is, the developing roller 30B is located at the one end of the casing 10B in the second direction. The developing roller 30B includes a developing roller main body 31B and a developing roller shaft 32B. The developing roller main body 31B is a cylindrical member extending in the first direction. As the material used for the developing roller main body 31B, rubber having resilience is used, for example. The developing roller shaft 32B is a cylindrical member that extends in the first direction and passes completely through the developing roller main body 31B. The developing roller shaft 32B is electrically conductive. For the material of the developing roller shaft 32B, metal or resin having electrical conductivity is used.

The developing roller main body 31B is fixed to the developing roller shaft 32B so as not to rotate relative to the developing roller shaft 32. Furthermore, a developing roller gear 51B included in the gear unit 50B is attached to an end portion of the developing roller shaft 32B in the first direction. The developing roller shaft 32B is fixed to the developing roller gear 51B so as not to rotate relative to the developing roller gear 51B. Accordingly, when the developing roller gear 51B rotates, the developing roller shaft 32B rotates, and the developing roller main body 31B also rotates together with the developing roller shaft 32B.

Note that the developing roller shaft 32B need not pass completely through the developing roller main body 31B in the first direction. For example, the developing roller shaft 32B may comprise two respective parts that extend in the first direction from both ends of the developing roller main body 31B in the first direction.

The developing cartridge 1B includes a supply roller which is not illustrated from FIGS. 12 to 18. The supply roller is a roller that is rotatable about a rotation axis extending in the first direction. The supply roller is located between the agitator 20B and the developing roller 30B. The supply roller includes a supply roller main body and a supply roller shaft. The supply roller main body is a cylindrical member extending in the first direction. As the material used for the supply roller main body, rubber having resilience is used, for example. The supply roller shaft is a columnar member extending in the first direction so as to pass completely through the supply roller main body.

The supply roller main body is fixed to the supply roller shaft so as not to rotate relative to the supply roller shaft. In addition, a supply roller gear (not illustrated) included in the gear unit 50B is attached to an end of the supply roller shaft in the first direction. The supply roller shaft is fixed to the supply roller gear so as not to rotate relative to the supply roller gear. Consequently, when the supply roller gear rotates, the supply roller shaft also rotates and, thus, the supply roller main body also rotates together with the supply roller shaft.

Note that the supply roller shaft need not pass completely through the supply roller main body in the first direction. For example, the supply roller shaft may comprise two respective parts that extend in the first direction from both ends of the supply roller main body in the first direction.

When the developing cartridge 1B receives the driving force, the developer material is supplied from the accommodation chamber 13B in the casing 10B to the outer peripheral surface of the developing roller 30B via the supply roller. At this time, the developer material is triboelectrically charged between the supply roller and the developing roller 30B. In addition, a bias voltage is applied to the developing roller shaft 32B of the developing roller 30B. For this reason, the developer material is attracted to the outer peripheral surface of the developing roller main body 31B by the electrostatic force between the developing roller shaft 32B and the developer material.

Furthermore, the developing cartridge 1B includes a layer thickness regulation blade (not illustrated). The layer thickness regulation blade shapes the developer material supplied onto the outer peripheral surface of the developing roller main body 31B into a predetermined thickness. Thereafter, the developer material on the outer peripheral surface of the developing roller main body 31B is supplied to a photosensitive drum 92B (described below) of the drum cartridge 2B. At this time, the developer material moves from the developing roller main body 31B onto the photosensitive drum 92B in accordance with an electrostatic latent image formed on the outer peripheral surface of the photosensitive drum 92B. In this manner, the electrostatic latent image is visualized on the outer peripheral surface of the photosensitive drum 92B.

The gear unit 50B is located at the second outer surface 12B of the casing 10B. As illustrated in FIG. 5, the gear unit 50B includes the above-described agitator gear, developing roller gear 51B, and supply roller gear, and a plurality of idle gears, a coupling 52B, and a gear cover 53B. The gear cover 53B and the casing 10B together constitute the overall casing of the developing cartridge 1B. The gear cover 53B is fixed to the second outer surface 12B of the casing 10B by, for example, screwing. At least some of the plurality of gears are located between the second outer surface 12B and the gear cover 53B.

The gear cover 53B includes a cylindrical collar 531B protruding in the first direction. The coupling 52B is housed inside the collar 531B. The coupling 52B has an engagement portion 521B that is recessed in the first direction. The engagement portion 521B is exposed from the gear cover 53B. When the developing cartridge 1B mounted on the drum cartridge 2B is mounted in an image forming apparatus having a drive shaft, the drive shaft of the image forming apparatus is connected to the engagement portion 521B of the coupling 52B. Thus, the rotation of the drive shaft of the image forming apparatus is transmitted to the agitator gear, the plurality of idle gears, the developing roller gear 51B, and the supply roller gear via the coupling 52B.

The plurality of gears included in the gear unit 50B may transmit the rotational force by meshing of teeth or may transmit the rotational force by friction.

The first bearing 60B is located at the first outer surface 11B of the casing 10B. The first bearing 60B rotatably supports one end portion of the developing roller shaft 32B in the first direction. As illustrated in FIG. 4, the first bearing 60B has a first end portion 61B and a second end portion 62B. The second end portion 62B is farther away from the developing roller shaft 32B than the first end portion 61B. In addition, the second end portion 62B is farther away in the second direction from the one end 10*a* of the casing 10B in the second direction than the first end portion 61B is to the one end 10*a* of the casing in the second direction. The first bearing 60B extends along the first outer surface 11B of the casing 10B between the first end portion 61B and the second end portion 62B.

The first bearing 60B includes a first arm 63B and a second arm 64B. The second arm 64B is farther away from the developing roller shaft 32B than the first arm 63B. In addition, the second arm 64B is farther away from the one end 10*a* in the second direction of the casing 10B than the first arm 63B is to the one end 10*a* in the second direction. The first arm 63B has the first end portion 61B described above. The second arm 64B has the second end portion 62B described above. The first arm 63B extends along the first outer surface 11B of the casing 10B, for example, linearly. The second arm 64B extends along the first outer surface 11B of the casing 10B, for example, linearly. Note that the first arm 63B is at an angle to the second arm 64B. The angle formed by the first arm 63B and the second arm 64B is an obtuse angle.

According to the present embodiment, the first arm 63B and the second arm 64B are integrally formed. However, the first arm 63B and the second arm 64B may be separate parts. In this case, the first arm 63B and the second arm 64B can be fixed to each other.

The first bearing 60B has a first insertion hole 65B. The first insertion hole 65B extends in the first direction in the first end portion 61B of the first bearing 60B. The first insertion hole 65B may be a through-hole passing through the first end portion 61B in the first direction. Alternatively, the first insertion hole 65B may be a hole that does not pass through the first end portion 61B. The first insertion hole 65B has a cylindrical inner peripheral surface. One end portion of the developing roller shaft 32B in the first direction is inserted into the first insertion hole 65B. In this manner, the first bearing 60B is attached to the one end portion of the developing roller shaft 32B in the first direction. Thus, the one end portion of the developing roller shaft 32B in the first direction is supported so as to be rotatable about a rotation axis A1 extending in the first direction. In addition, the first bearing 60B is rotatable about the developing roller shaft 32B with respect to the casing 10. More specifically, the second end portion 62B is pivotable about the rotation axis A1 with respect to the first end portion 61B.

The first bearing 60B serves as an electrically conductive member which, because it provides electrical connection to the developing roller shaft 32B, is described herein as a developing electrode. The first bearing 60B is made of, for example, a conductive resin. However, the first bearing 60B may be made of metal. The first end portion 61B of the first bearing 60B is in contact with the one end portion of the developing roller shaft 32B in the first direction. Consequently, the first end portion 61B of the first bearing 60B is electrically connected to the developing roller shaft 32B.

In addition, the first bearing 60B has a first hole 67B. The first hole 67B is located in the second direction between the first end portion 61B and the second end portion 62B. Furthermore, the first hole 67B passes completely through the first bearing 60B in a pivotal direction about the rotation axis A1. That is, the first hole 67B extends in a third direction crossing the first direction and the second direction. However, the first hole 67B need not pass completely through the first bearing 60B. The other end portion 112B of the first lever 110B (described below) is inserted into the first hole 67B.

The first lever 110B is located at the first outer surface 11B of the casing 10B. As illustrated in FIG. 16, the first lever 110B has one end portion 111B, the other end portion 112B, and a portion 113B having a pivot surface and configured to function as a pivot point 113B, the portion 113B having the form/shape of a cam and herein referred to as a cam surface 113B. The one end portion 111B is located at one end 110*a* of the first lever 110B in the third direction. The other end portion 112B is located at the other end 110*b* of the first lever 110B in the third direction. That is, the other end portion 112B is far away from the one end portion 111B in the third direction toward other side 3*b* of the third direction. The cam surface 113B is located between the one end portion 111B and the other end portion 112B in the third direction. In addition, the one end portion 111B of the first lever 110B includes a first protruding portion 114B herein referred to as a first convex portion 114B. The first convex portion 114B protrudes from the one end portion 111B of the first lever 110B in the first direction. The other end portion 112B of the first lever 110B includes a second protruding portion 115B herein referred to as a second convex portion 115B. The second convex portion 115B protrudes from the other end portion 112B of the first lever 110B in the first direction.

The first lever 110B is movable relative to the casing 10B. When the developing cartridge 1B is being mounted on the drum cartridge 2B, the cam surface 113B can be brought into contact with a drum frame 91B (described below) of the drum cartridge 2B. The first lever 110B is pivotable about the cam surface 113B between a first position and a second position.

The holder 120B is located at the first outer surface 11B of the casing 10B. The holder 120B is fixed to the first outer surface 11B of the casing 10B by, for example, screwing. A portion of the first lever 110B is located between the first outer surface 11B and the holder 120B. The first convex portion 114B of the first lever 110B is located closer to the one side 3*a* in the third direction than the holder 120B is to the one side 3*a* in the third direction. The second convex portion 115B of the first lever 110B is located closer to the other side 3B of the holder 120B in the third direction than the holder 120B is to the other side 3*b* of the holder 120B in the third direction. The first convex portion 114B and the holder 120B face each other in the third direction. Thus, the first lever 110B is prevented from coming off the holder 120B toward the other side 3B in the third direction. That is, the holder 120B holds the first lever 110B such that the first lever 110B is movable with respect to the casing 10B.

Figure 19:
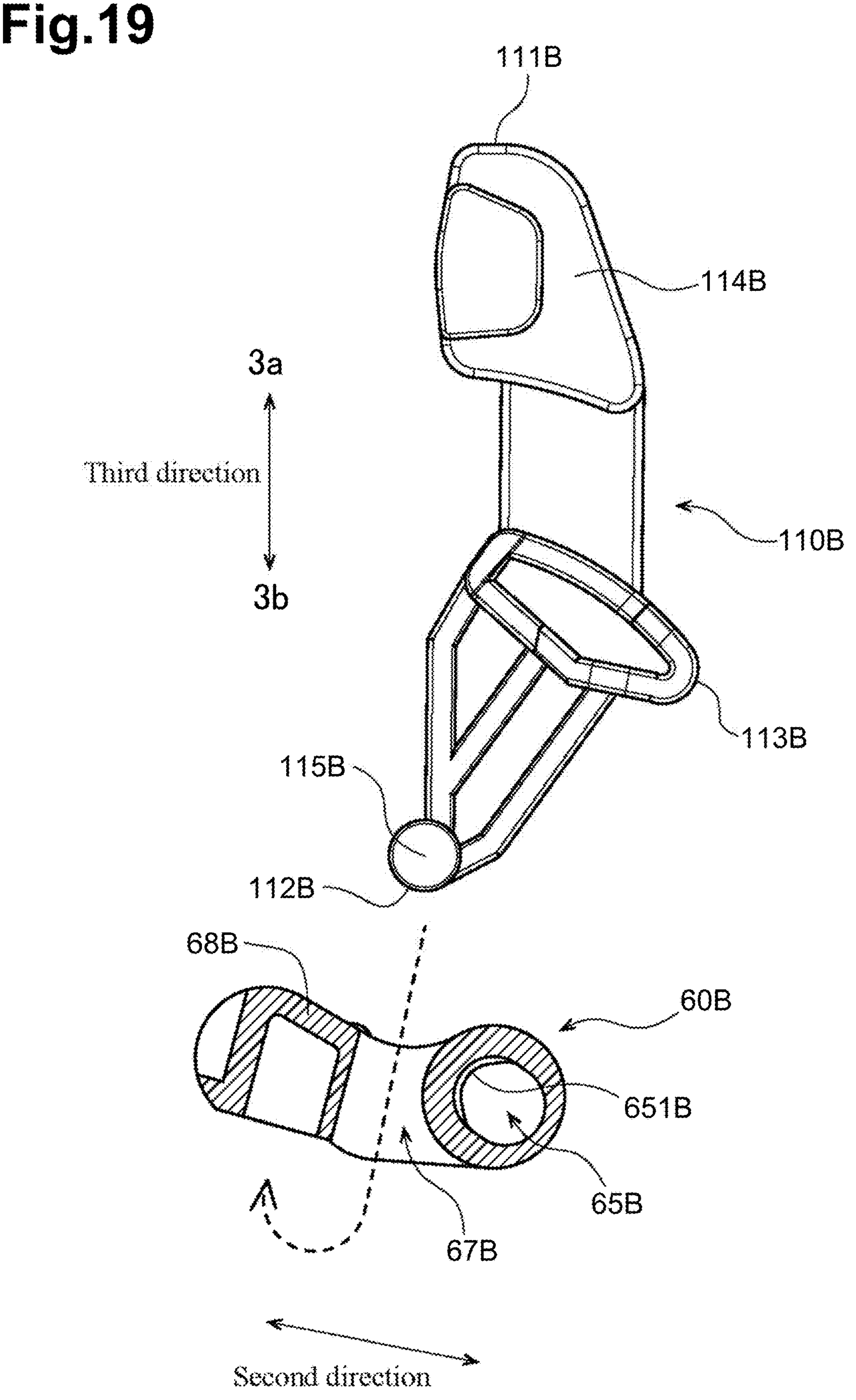
FIG. 19 is a cross-sectional view of a first bearing and a side view of a first lever in the second embodiment.

FIG. 19 shows a cross-sectional view of the first bearing 60B and a side view of the first lever 110B. As indicated by a broken arrow in FIG. 19, the other end portion 112B of the first lever 110B is inserted into the first hole 67B of the first bearing 60B. Furthermore, the first bearing 60B includes a lever receiving portion 68B. The lever receiving portion 68B is located in the first hole 67B. The lever receiving portion 68B has U shape which is open toward other side 3*b* of the third direction. The second convex portion 115B of the first lever 110B is inserted into the lever receiving portion 68B. Consequently, the other end portion 112B of the first lever 110B engages with the first bearing 60B. As a result, the first lever 110B is prevented from coming off from the first bearing 60B to one side in the third direction.

As illustrated in FIG. 19, the first bearing 60B includes a wall portion 651B having an arc shape being located at a circumferential portion of the first insertion hole 65B. The wall portion 651B protrudes toward one side of the circumferential portion of the first insertion hole 65B in the second direction from a portion of the other side of the circumferential portion of the first insertion hole 65B in the second direction. As illustrated in FIG. 16, the developing roller shaft 32B includes an engagement groove 321B having a circular shape and the engagement groove 321B is located at an outer circumferential surface of the developing roller shaft 321B. The engagement groove 321B is located closer to one side of the first direction than the first outer surface 11B of the casing 10B. The wall portion 651B protrudes toward the engagement groove 321B.

Figure 20:
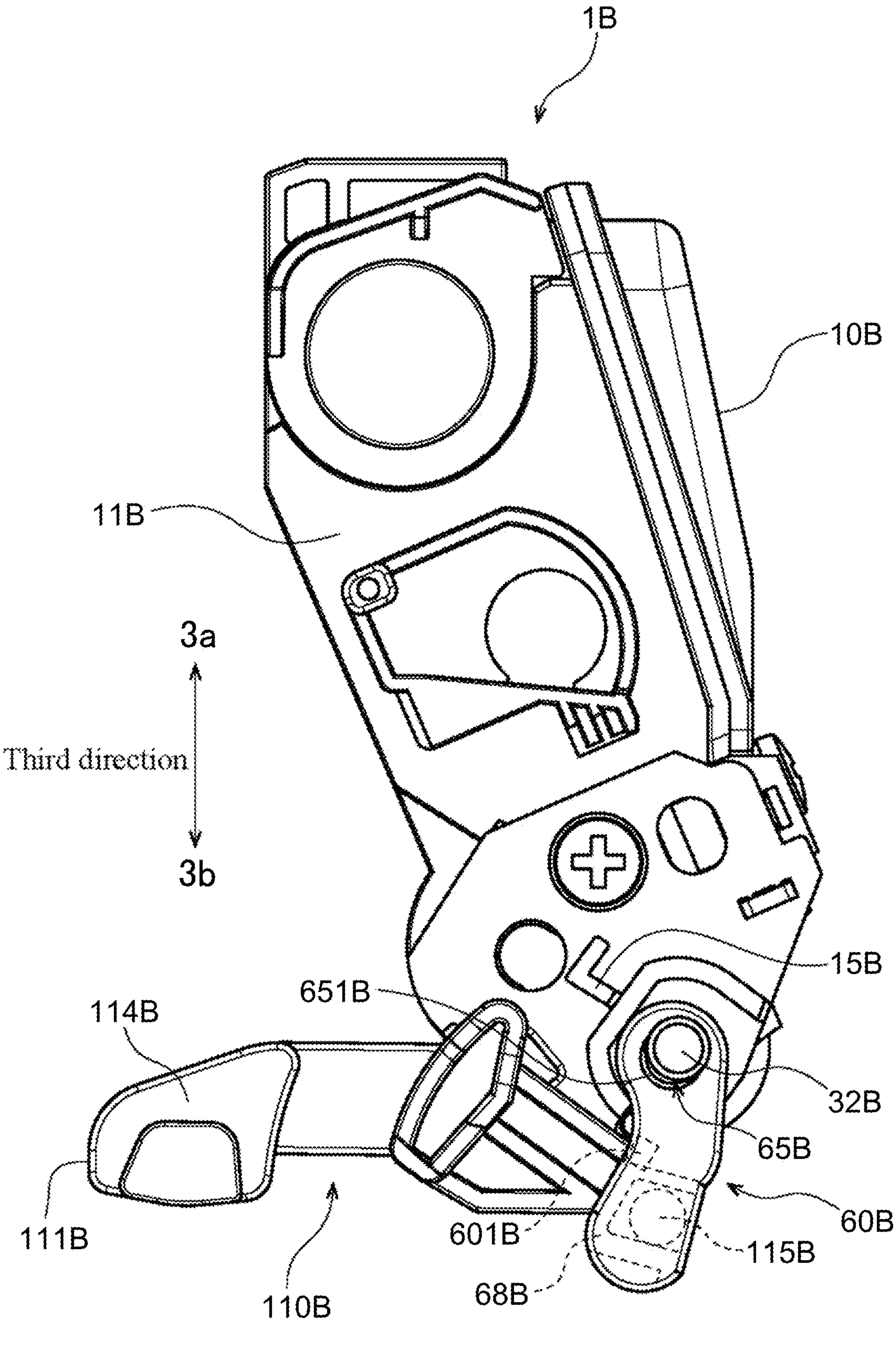
FIG. 20 is a view of a first bearing, a first lever, and a holder being attached to the developing cartridge in the second embodiment.
Figure 21:
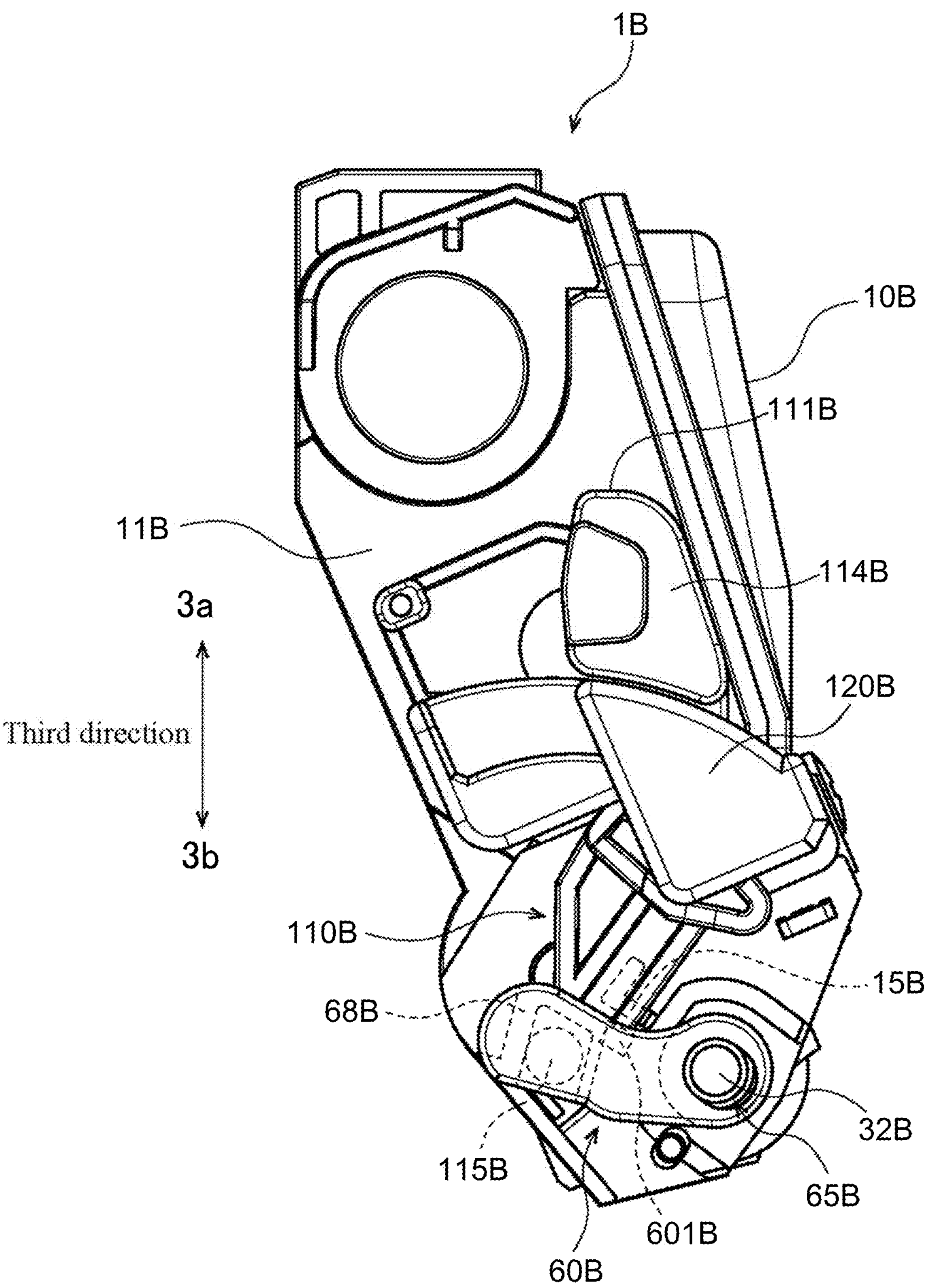
FIG. 21 is a view of a first bearing, a first lever, and a holder being attached to the developing cartridge in the second embodiment.

FIGS. 20 and 21 are views of the first bearing 60B, the first lever 110B, and holder 120B being attached to the developing cartridge 1B.

First, the second convex portion 115B of the first lever 110B is inserted into the lever receiving portion 68B of the first bearing 60B, when the first bearing 60B, the first lever 110B, and holder 120B are attached to the developing cartridge 1B. Consequently, the other end portion 112B of the first lever 110B can engage with the first bearing 60B. Next, as illustrated in FIG. 20, the developing roller shaft 32B is inserted into the first insertion hole 65B of the first bearing 60B. Additionally, the first bearing 60B and the first lever 110B are pivoted about the rotation axis A1 toward the one side 3*a* of the third direction. Subsequently, as illustrated FIG. 21, the holder 120B is fixed to the first outer surface 11B of the casing 10B. As a result, the first lever 110B is held by the holder 120B.

As described above, in a case where the first lever 110B engaging with the first bearing 60B is held by the holder 120B, the wall portion 651B of the first bearing 60B is inserted into the engagement groove 321B of the developing roller shaft 32B. As a result, the first bearing 60B is prevented from coming off from the developing roller shaft 32B to one side in the first direction.

The first bearing 60B pivots about the rotation axis A1 from one side 3*a* of the third direction to the other side 3*b* of the third direction, the first lever 110B moves from one side 3*a* of the third direction to the other side 3*b* of the third direction together with the lever receiving portion 68B of the first bearing 60B. Note that a movement of the first lever 110B from one side 3*a* of the third direction to the other side 3*b* of the third direction is stopped by contacting the first convex portion 114B of the first lever 110B with holder 120B. Furthermore, a pivotable movement of the first bearing 60B from one side 3*a* of the third direction to the other side 3*b* of the third direction is also stopped by contacting the lever receiving portion 68B of the first bearing 60B with the second convex portion 115B located at the other end portion 112B of the first lever 110B when the movement of the first lever 110B is stopped. As a result, the pivot range of the first bearing 60B toward the other side 3*b* of the third direction is restricted. In case where the first bearing 60B pivots from one side 3*a* of the third direction to the other side 3*b* of the third direction, the first lever 110*b* may stop the pivotable movement of the first bearing 60B from one side 3*a* of the third direction to the other side 3*b* of the third direction after the first lever 110*b* allows the first bearing 60B to pivot a predetermined degree from the one side 3*a* of the third direction to the other side 3*b* of the third direction.

As described above, in the second embodiment of the developing cartridge 1B, the holder 120B prevents the first lever 110B from coming off from one side 3*a* of the third direction to the other side 3*b* of the third direction. And, the first lever 110B stop a pivotable movement the first bearing 60B from one side 3*a* of the third direction to the other side 3*b* of the third direction. Therefore, one or more of parts, which are different from the first lever 110B and holder 120B, for stopping the pivotable movement of the first bearing 60B from one side 3*a* of the third direction to the other side 3*b* of the third direction is not needed to be provided in the developing cartridge 1B. Consequently, the number of parts in the developing cartridge 1B can be reduced.

Additionally, as illustrated in FIGS. 16 and 20, the casing 10B includes a casing protrusion 15B. The casing protrusion 15B extends from the first outer surface 11B of the casing 11B to one side of the first direction. On the other hand, as indicated by a broken arrow in FIGS. 20 and 21, the first bearing 60B includes an electrode protrusion 601B. The electrode protrusion 601B extends in the first direction from the first bearing 60B toward the first outer surface 11B of the casing 10B.

When the first bearing 60B pivots about the rotation axis A1 from the other side 3*b* of the third direction to the one side 3*a* of the third direction, the electrode protrusion 601B is in contact with the casing protrusion 15B. As a result, a pivotable movement the first bearing 60B from the other side 3*b* of the third direction to one side 3*a* of the third direction is stopped. Thus, in the developing cartridge 1B of the second embodiment, the casing protrusion 15B of the casing 10B stops the pivotable movement of the first bearing 60B from the other side 3*b* of the third direction to one side 3*a* of the third direction. Therefore, one or more of parts, which are different from the casing 10B, for stopping the pivotable movement of the first bearing 60B from the other side 3*b* of the third direction to one side 3*a* of the third direction is not needed to be provided in the developing cartridge 1B. Consequently, the number of parts in the developing cartridge 1B can be reduced.

The second bearing 70B is located at the second outer surface 12B of the casing 10B. More specifically, the second bearing 70B is located at the outer surface of the gear cover 53B. The first bearing 60B and the second bearing 70B are located so as to overlap each other, as viewed in the first direction. The second bearing 70B rotatably supports the other end portion of the developing roller shaft 32B in the first direction. As illustrated in FIGS. 17 and 18, the second bearing 70B has a third end portion 71B and a fourth end portion 72B. The fourth end portion 72B is farther away from the developing roller shaft 32B than the third end portion 71B. In addition, the fourth end portion 72B is farther away in the second direction from the one end 10*a* of the casing 10B in the second direction than the third end portion 71B is from the one end 10*a* of the casing 10 in the second direction. The second bearing 70B extends along the second outer surface 12B of the casing 10B between the third end portion 71B and the fourth end portion 72B.

The second bearing 70B includes a third arm 73B and a fourth arm 74B. The fourth arm 74B is farther away from the developing roller shaft 32B than the third arm 73B. In addition, the fourth arm 74B is farther away in the second direction from the one end 10*a* of the casing 10B in the second direction than the third arm 73B is from the one end 10*a* of the casing 10B in the second direction. The third arm 73B has the third end portion 71B described above. The fourth arm 74B has the fourth end portion 72B described above. The third arm 73B extends along the second outer surface 12B of the casing 10B, for example, linearly. The fourth arm 74B extends along the second outer surface 12B of the casing 10B, for example, linearly. However, the third arm 73B is at an angle to the fourth arm 74B. The angle formed by the third arm 73B and the fourth arm 74B is an obtuse angle.

According to the second embodiment, the third arm 73B and the fourth arm 74B are integrally formed. However, the third arm 73B and the fourth arm 74B may be separate parts. In this case, it is only required that the third arm 73B and the fourth arm 74B are fixed to each other.

Figure 22:
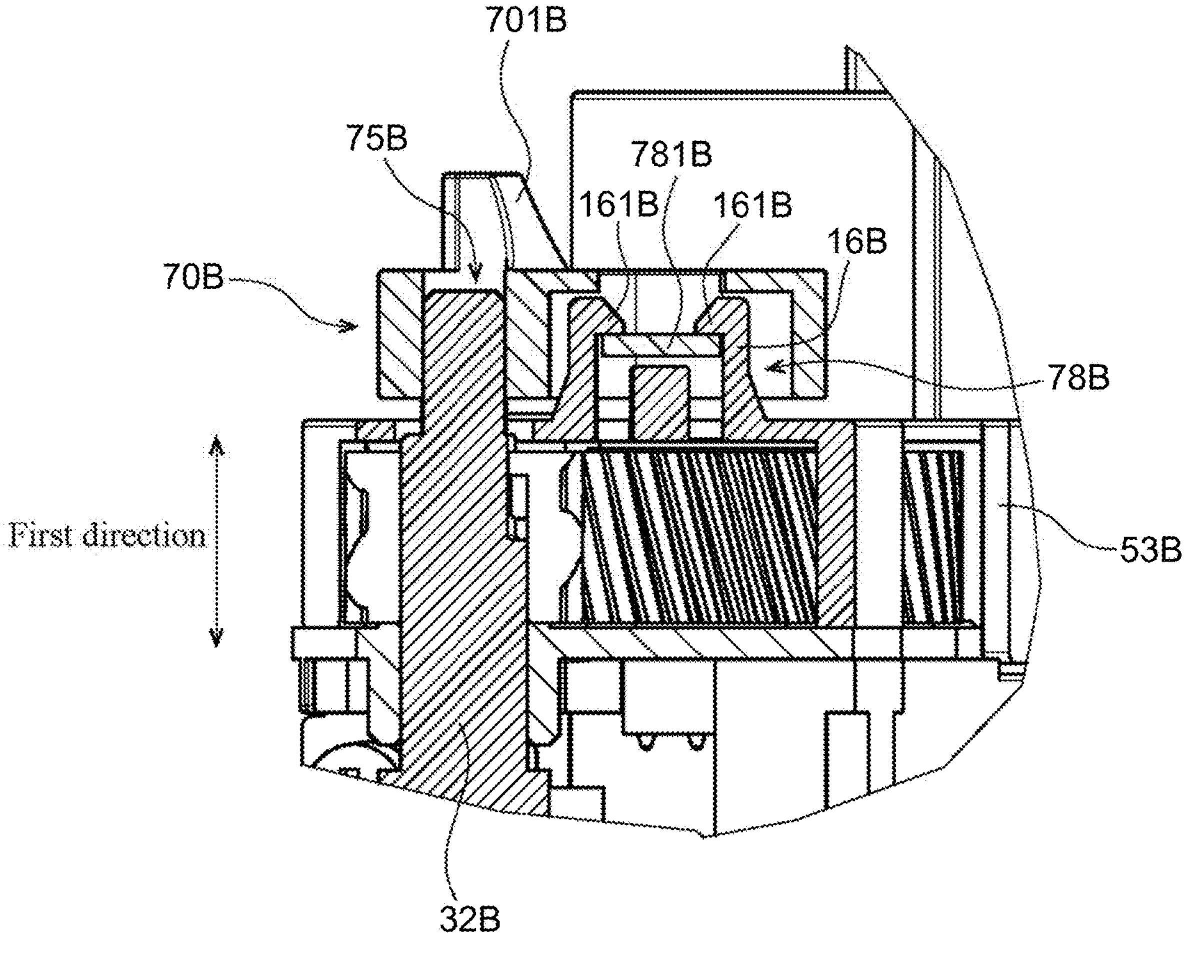
FIG. 22 is a cross-sectional view of a portion of the developing cartridge in the vicinity of a second bearing in the second embodiment.

FIG. 22 shows a cross-sectional view of developing cartridge 1B in the vicinity of the second bearing 70B. As illustrated in FIGS. 17, 18 and 22, the second bearing 70B has a second insertion hole 75B. The second insertion hole 75B extends in the first direction in the third end portion 71B of the second bearing 70B. The second insertion hole 75B may be a through-hole passing through the third end portion 71B in the first direction. Alternatively, the second insertion hole 75B may be a hole that does not pass through the third end portion 71B. The second insertion hole 75B has a cylindrical inner circumferential surface. The other end portion of the developing roller shaft 32B in the first direction is inserted into the second insertion hole 75B. In this manner, the second bearing 70B is attached to the other end portion of the developing roller shaft 32B in the first direction. Thus, the other end portion of the developing roller shaft 32B in the first direction is supported so as to be rotatable about a rotation axis A1 extending in the first direction. In addition, the second bearing 70B is also pivotable about the developing roller shaft 32B with respect to the casing 10B. More specifically, the fourth end portion 72B is pivotable about the rotation axis A1 with respect to the third end portion 71B.

In addition, the second bearing 70B has a second hole 78B. The second hole 78B extends in the first direction between the third end portion 71B and the fourth end portion 72B. Furthermore, the second hole 78B passes completely through the second bearing 70B in the first direction. However, the second hole 78B need not pass completely through the second bearing 70B.

As illustrated in FIG. 22, the second bearing 70B includes a claw receiving portion 781B. The claw receiving portion 781B is located in the second hole 78B. The casing 10B includes two claw portions 16B. Each claw portion 16B extends from the second outer surface 12B of the casing 10B toward the other side of the first direction. In the second embodiment, the two claw portions 16B extends from an outer surface of the gear cover 53B configured to function as a portion of the casing 10B.

A distal end portion 161B of the claw portion 16B is located in the second hole 78B. The distal end portion 161B of the claw portion 16B protrudes toward a direction crossing the first direction and the distal end portion 161B of the claw portion 16B engages with a surface of the claw receiving portion 781B. The surface of the claw receiving portion 781B is located at the other side of the claw receiving portion 781B in the first direction. As a result, the second bearing 70B is held with respect to the gear cover 53B. In addition, the second bearing 70B is prevented from coming off toward one side of the first direction. As a result, an engagement groove for preventing the second bearing 70B from coming off is not needed to be provided in a portion of the developing roller shaft 32B. The portion of the developing roller shaft 32B is inserted into the second insertion hole 75B.

In a case where the second bearing 70B pivots about the rotation axis A1 from one side 3*a* of the third direction to the other side 3*b* of the third direction, a portion of the second bearing 70B is in contact with the claw portion 16B. The portion of the second bearing 70B is closer to one side of the second bearing 70B in the third direction than the second hole 78B to the one side of the second bearing 70B in the third direction. As a result, a pivotable movement the second bearing 70B from one side 3*a* of the third direction to the other side 3*b* of the third direction is stopped.

In addition, in a case where the second bearing 70B pivots about the rotation axis A1 from the other side 3*b* of the third direction to one side 3*a* of the third direction, a portion of the second bearing 70B is in contact with the claw portion 16B. The portion of the second bearing 70B is closer to the other side of the second bearing 70B in the third direction than the second hole 78B to the other side of the second bearing 70B in the third direction. As a result, a pivotable movement the second bearing 70B from the other side 3*b* of the third direction to one side 3*a* of the third direction is stopped.

Thus, in the developing cartridge 1B of the second embodiment, the claw portion 16B stop the pivotable movement of the second bearing 70B. therefore, one or more of parts, which are different from the claw portion 16B, for stopping the pivotable movement of the second bearing 70B is not needed to be provided in the developing cartridge 1B. Consequently, the number of parts in the developing cartridge 1B can be reduced.

Furthermore, as illustrated in FIGS. 17 and 18, the second bearing 70B includes a pressed protrusion 701B. The pressed protrusion 701B protrudes from a surface being located at the other side of the second bearing 70B in the first direction toward the other side of the first direction. In other word, the pressed protrusion 701B protrudes in a direction far away from the casing 10B. The pressed protrusion 701B is contactable with a release lever 97B of the drum cartridge 2B described below in a case where a below described separation operation is performed.

<2-3. Structure of Drum Cartridge>

As illustrated in FIGS. 12, 13 and 14, the drum cartridge 2B includes the drum frame 91B and the photosensitive drum 92B. The developing cartridge 1B is mounted on the drum frame 91B. The photosensitive drum 92B is a cylindrical drum which is rotatable about a rotation axis extending in the first direction. The outer peripheral surface of the photosensitive drum 92B is coated with a photosensitive material. The photosensitive drum 92B is located at one end of the drum frame 91B in the second direction. When the developing cartridge 1B is being mounted on the drum frame 91B, the outer peripheral surface of the developing roller 30B is in contact with the outer peripheral surface of the photosensitive drum 92B.

Figure 23:
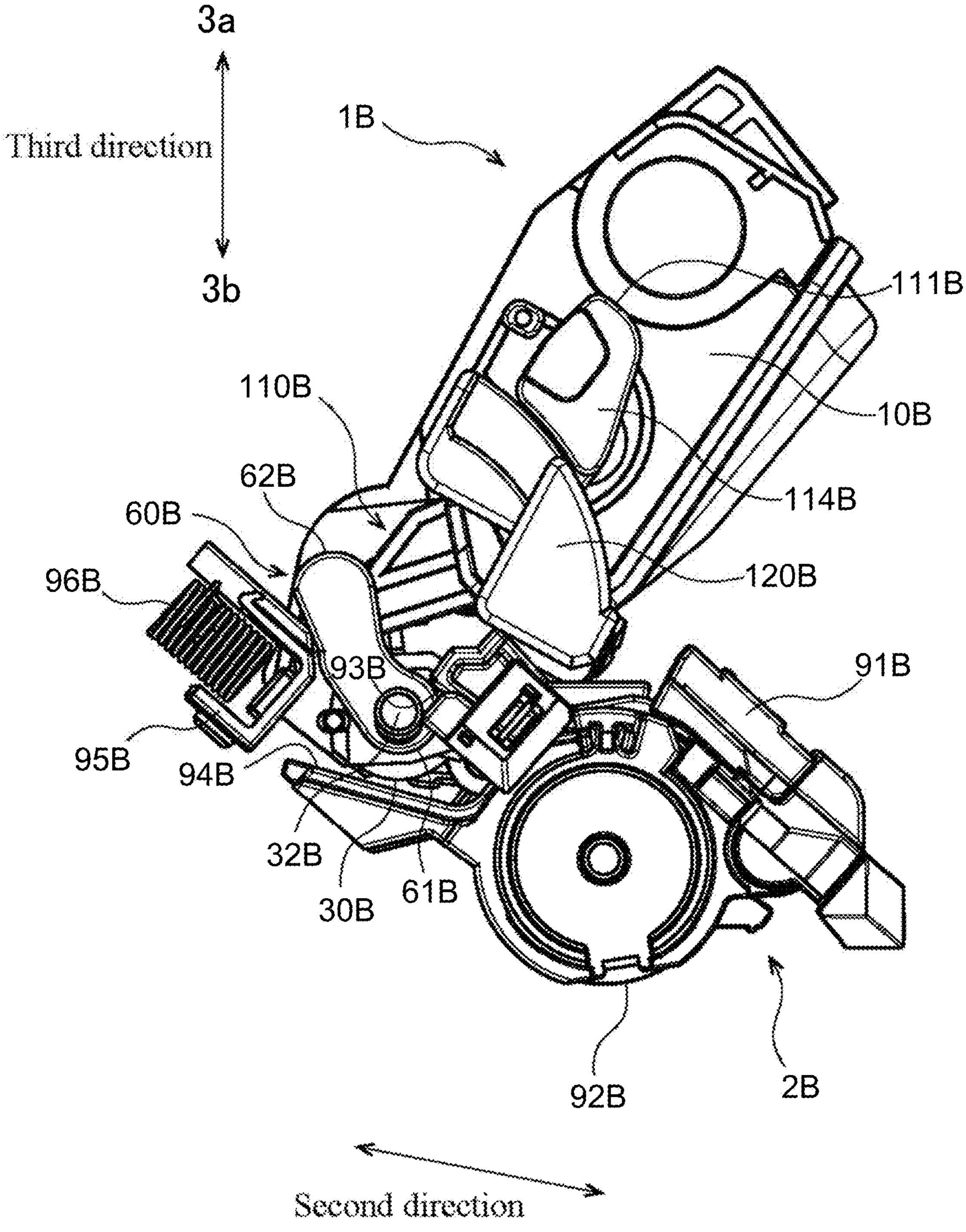
FIG. 23 is a view of the developing cartridge being mounted on the drum cartridge as viewed from one side of a first direction in the second embodiment.
Figure 24:
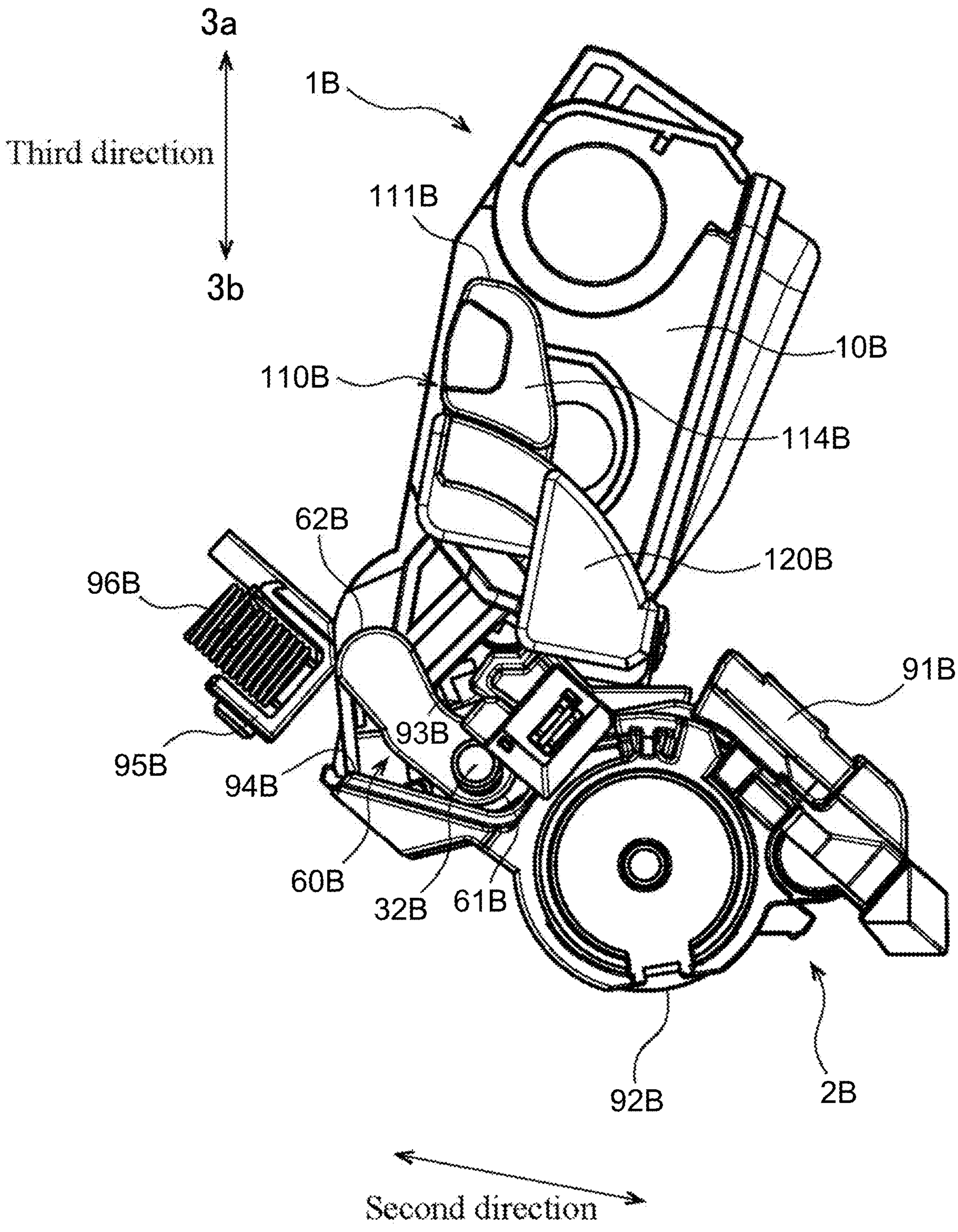
FIG. 24 is a view of the developing cartridge being mounted on the drum cartridge as viewed from one side of a first direction in the second embodiment.
Figure 25:
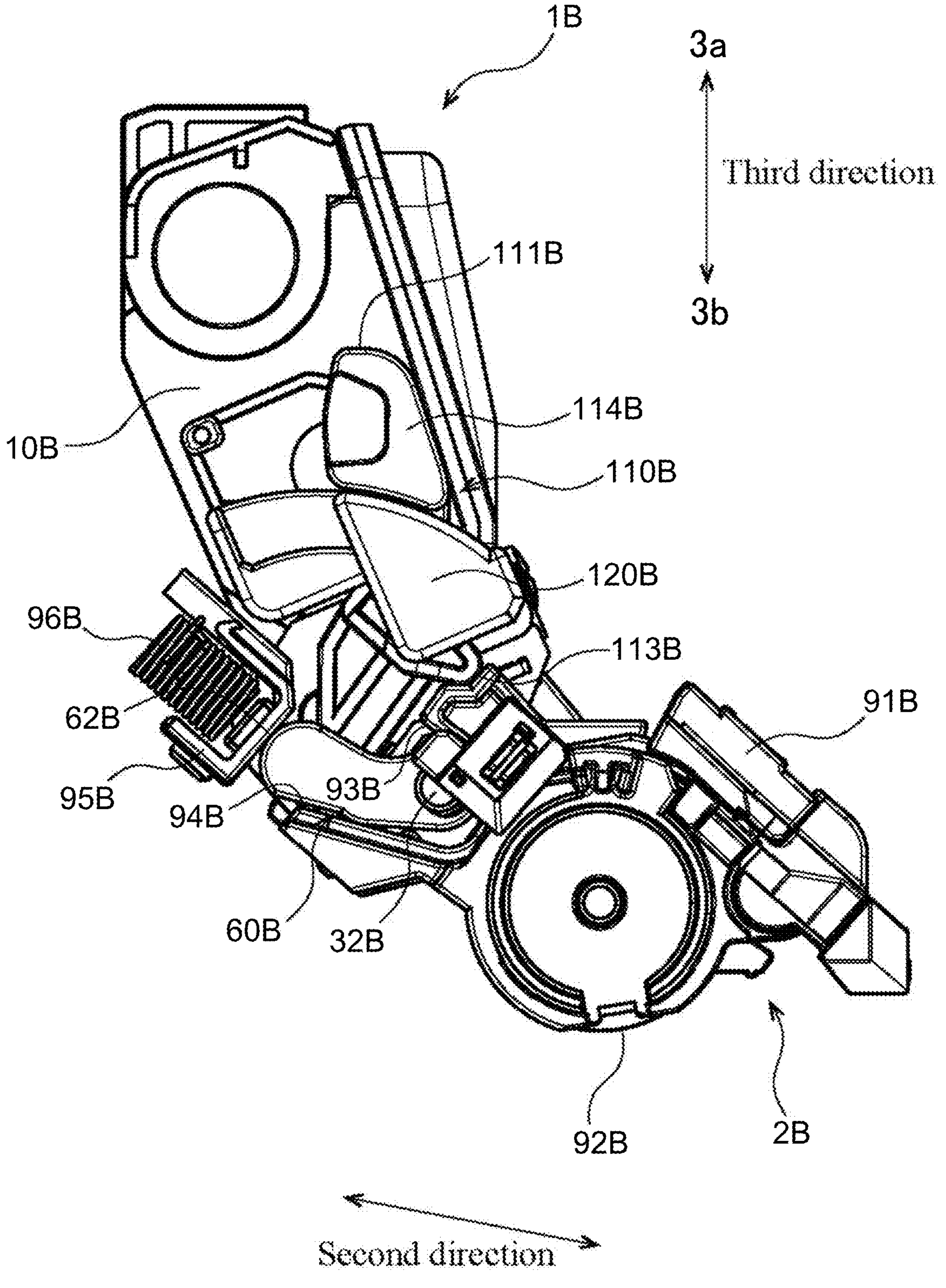
FIG. 25 is a view of a drum cartridge in a state where a developing cartridge is mounted on the drum cartridge as viewed from one side of a first direction in the second embodiment.
Figure 26:
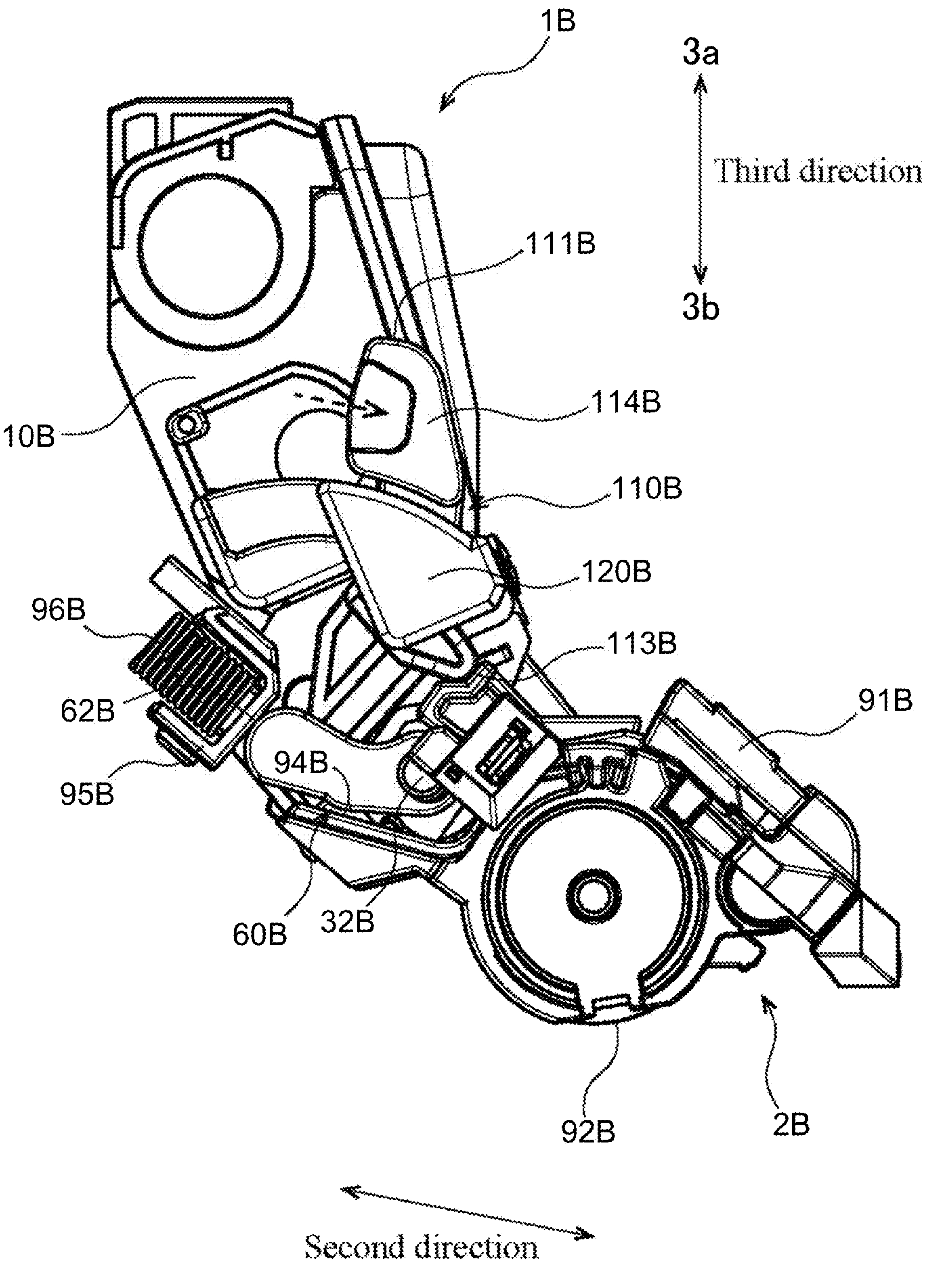
FIG. 26 is a view of the developing cartridge and the drum cartridge when the developing cartridge is in a separation operation as viewed from one side of a first direction in the second embodiment.
Figure 27:
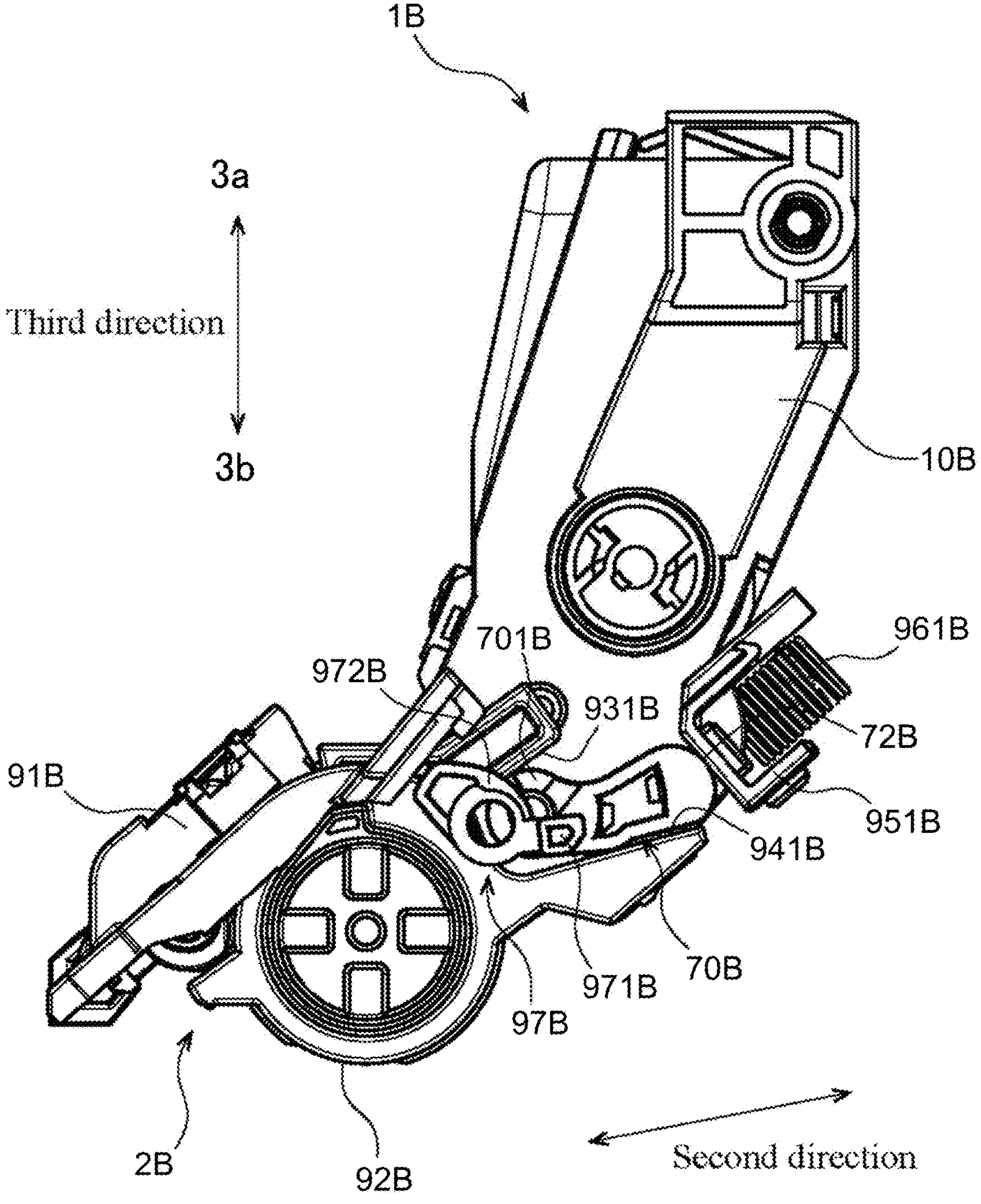
FIG. 27 is a view of a drum cartridge in a state where a developing cartridge is mounted on the drum cartridge as viewed from other side of a first direction in the second embodiment.
Figure 28:
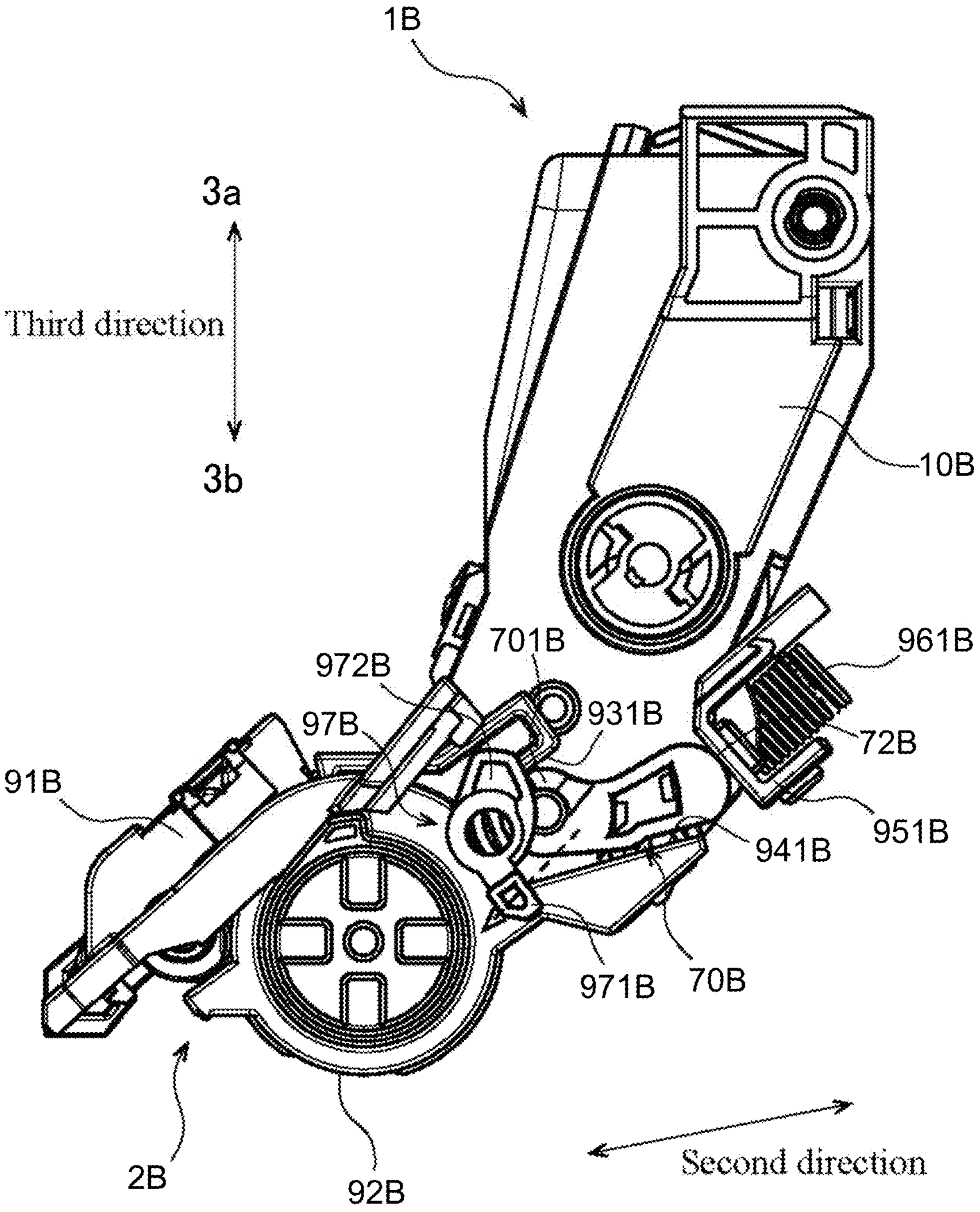
FIG. 28 is a view of the developing cartridge and the drum cartridge when the developing cartridge is in a separation operation as viewed from other side of a first direction in the second embodiment.

FIGS. 23 and 24 are views of the developing cartridge 1B being mounted on the drum cartridge 2B as viewed from one side in the first direction. FIG. 25 is a cross-sectional view of the developing cartridge 1B and the drum cartridge 2B after the developing cartridge 1B is mounted on the drum cartridge 2B. FIG. 26 is a view of the developing cartridge 1B and the drum cartridge 2B when the described-below separation operation is performed as viewed from one side in the first direction. FIG. 27 is a view of the developing cartridge 1B and the drum cartridge 2B in a case where the developing cartridge 1B being mounted on the drum cartridge 2B as viewed from the other side in the first direction. FIG. 28 is a view of the developing cartridge 1B and the drum cartridge 2B when the described-below separation operation is performed as viewed from the other side in the first direction.

As illustrated in FIGS. 23, 24 and 25, the drum cartridge 2B has a first guide surface 93B and a second guide surface 94B. The first guide surface 93B and the second guide surface 94B are located at one end of the drum frame 91B in the first direction. In addition, the first guide surface 93B and the second guide surface 94B are separated in the rotational direction about the rotation axis of the photosensitive drum 92B.

Furthermore, as illustrated in FIGS. 23, 24, 25 and 26, the drum cartridge 2B includes a first pressing member 95B and a first coil spring 96B. The first pressing member 95B and the first coil spring 96B are electrically conductive. The first pressing member 95B is made of, for example, a conductive resin. The first coil spring 96B is made of, for example, metal. The first pressing member 95B and the first coil spring 96B are located at one end of the drum frame 91B in the first direction. The first coil spring 96B is a resilient member that can expand and contract in the second direction. One end of the first coil spring 96B in the second direction is connected to the first pressing member 95B. The other end of the first coil spring 96B in the second direction is connected to the drum frame 91B. When the developing cartridge 1B is mounted on the drum cartridge 2B, the first pressing member 95B presses the second end portion 62B of the first bearing 60B toward the photosensitive drum 92B by the resilience force of the first coil spring 96B.

As illustrated in FIGS. 27 and 28, the drum cartridge 2B further has a third guide surface 931B and a fourth guide surface 941B. The third guide surface 931B and the fourth guide surface 941B are located at the other end of the drum frame 91B in the first direction. The third guide surface 931B and the fourth guide surface 941B are separated each other in a rotational direction of the photosensitive drum 92B which being rotatable about the rotation axis.

In addition, as illustrated in FIGS. 27 and 28, the drum cartridge 2B includes a second pressing member 951B and a second coil spring 961B. The second pressing member 951B and the second coil spring 961B are located at the other end 91B of the drum frame 91B in the first direction. The second coil spring 961B is a resilient member that can expand and contract in the second direction. One end of the second coil spring 961B in the second direction is connected to the second pressing member 951B. The other end of the second coil spring 961B in the second direction is connected to the drum frame 91B. When the developing cartridge 1B is mounted on the drum cartridge 2B, the second pressing member 951B presses the fourth end portion 72B of the second bearing 70B toward the photosensitive drum 92B by the resilience force of the second coil spring 961B.

Note that instead of using the first coil spring 96B and the second coil spring 961B, other types of resilient members may be used for the drum cartridge 2B. For example, the drum cartridge 2B may be provided with a spring other than a coil spring (e.g., a torsion spring or a leaf spring), rubber, or the like) as the resilient member.

In addition, as illustrated in FIGS. 27 and 28, the drum cartridge 2B includes a release lever 97B. The release lever 97B is located at the one end 91A of the drum frame 91B in the first direction. The release lever 97B is pivotable about a rotational axis extending in the first direction. Furthermore, the release lever 97B has a first lever arm 971B and a second lever arm 972B. When the developing cartridge 1B is mounted on the drum cartridge 2B, the second lever arm 972B faces the pressed protrusion 701B of the second bearing 70 in the second direction.

<2-4. Information about Operation to Mount Development Cartridge>

As illustrated in FIGS. 23 to 25, when the developing cartridge 1B is being mounted on the drum cartridge 2B, the developing cartridge 1B is moved relative to the drum cartridge 2B so that the developing roller 30B moves close to the photosensitive drum 92B. At this time, the first bearing 60B pivots about the rotation axis A1 according to a shape of the drum frame 91B. Similarly, the second bearing 70B pivots about the rotation axis A1 according to a shape of the drum frame 91B.

As described above, when the developing cartridge 1B is being mounted on the drum cartridge 2B, the first bearing 60B and the second bearing 70B pivot about the rotation axis A1 of the developing roller 30. As a result, without rotating the casing 10B with respect to the drum frame 91B to a large extent, the first bearing 60B can be placed between the photosensitive drum 92B and the first pressing member 95B. In addition, the second bearing 70B can be placed between the photosensitive drum 92B and the second pressing member 951B. Consequently, a user of the image forming apparatus can move the developing roller 30B close to the photosensitive drum 92B without performing the operation to rotate the casing 10B to a large extent.

When the first bearing 60B is placed between the photosensitive drum 92B and the first pressing member 95B, the first pressing member 95B is in contact with the second end portion 62B of the first bearing 60B. At this time, the first pressing member 95B presses the second end portion 62B of the first bearing 60B toward the photosensitive drum 92B by the resilience force of the first coil spring 96B. Then, as illustrated in FIG. 25, the first end portion 61B of the first bearing 60B is brought into contact with the first guide surface 93B, and the other portion of the first bearing 60B is brought into contact with the second guide surface 94B. In this manner, the position of the first bearing 60B relative to the drum frame 91B is fixed.

Similarly, the second pressing member 951B presses the fourth end portion 72B of the second bearing 70B toward the photosensitive drum 92B. At this time, as illustrated in FIG. 27, the third end portion 71B of the second bearing 70B is brought into contact with the third guide surface 931B, and the other portion of the second bearing 70B is brought into contact with the fourth guide surface 941B. In this manner, the position of the second bearing 70B relative to the drum frame 91B is fixed.

Furthermore, the first pressing member 95B presses the first bearing 60B with the positions of the first bearing 60B and the second bearing 70B relative to the drum frame 91B fixed. In addition, the second pressing member 951B presses the second bearing 70B. Thus, the outer peripheral surface of the developing roller 30B is brought into contact with the outer peripheral surface of the photosensitive drum 92B. In this manner, the developing roller 30B is urged against the photosensitive drum 92B.

As described above, according to the second embodiment, the first bearing 60B has the first end portion 61B and the second end portion 62B, and the second end portion 62B is pivotable with respect to the first end portion 61B. In addition, the second bearing 70B has the third end portion 71B and the fourth end portion 72B, and the fourth end portion 72B is pivotable with respect to the third end portion 71B. Consequently, the positioning of the developing roller 30B relative to the photosensitive drum 92B can be achieved by using the first end portion 61B and the second end portion 62B of the first bearing 60B and the third end portion 71B and the fourth end portion 72B of the second bearing 70B.

Furthermore, according to the second embodiment, when the developing cartridge 1B is being mounted on the drum cartridge 2B, the first bearing 60B and the second bearing 70B pivot about the rotation axis A1. In addition, when the developing cartridge 1B is being removed from the drum cartridge 2B, the first bearing 60B and the second bearing 70B pivot about the rotation axis A1 in the same manner. For this reason, the developing cartridge 1B can be smoothly mounted on or removed from the drum cartridge 2B by causing the first bearing 60B and the second bearing 70B to pivot without rotating the casing 10B.

<2-5. Information about Supply of Voltage>

The first pressing member 95B and the first coil spring 96B are electrically conductive. The first pressing member 95B is made of, for example, a conductive resin. The first coil spring 96B is made of, for example, metal. In addition, the drum cartridge 2B includes an electrode terminal 98B that is in electrical contact with the first coil spring 96B. As illustrated in FIGS. 12 and 13, the electrode terminal 98B is exposed on the outer surface of the drum frame 91B. Furthermore, as described above, the developing roller shaft 32B and the first bearing 60B are electrically conductive. For this reason, when the developing cartridge 1B is mounted on the drum cartridge 2B and, thus, the first pressing member 95B is brought into contact with the first bearing 60B, the electrode terminal 98B, the first coil spring 96B, the first pressing member 95B, the first bearing 60B, and the developing roller shaft 32B are electrically connected to one another.

When the developing cartridge 1B mounted on the drum cartridge 2B is mounted in the image forming apparatus, the electrode terminal of the image forming apparatus is in contact with the electrode terminal 98B of the drum cartridge 2B. Thus, a bias voltage is supplied from the image forming apparatus to the developing roller shaft 32B via the electrode terminal 98B, the first coil spring 96B, the first pressing member 95B, and the first bearing 60B. As a result, the developer material is attracted to the outer peripheral surface of the developing roller main body 31B by the electrostatic force generated by the bias voltage.

As described above, according to the second embodiment, the bias voltage is supplied to the first bearing 60B of the developing cartridge 1B via the first pressing member 95B of the drum cartridge 2B. In this way, the number of parts of the drum cartridge 2B can be reduced as compared with the case where a conductive part for supplying a voltage to the first bearing 60B is provided separately from the first pressing member 95B. Therefore, the size of the drum cartridge 2B can be reduced.

In addition, the first bearing 60B according to the second embodiment has (1) the capability of serving as a bearing for rotatably supporting the developing roller shaft 32B and (2) the capability of serving as a positioning member that determines the position of the developing roller 30B relative to the photosensitive drum 92B when the developing cartridge 1B is mounted on the drum cartridge 2B and (3) the capability of serving as a developing electrode for supplying a bias voltage to the developing roller shaft 32B. For this reason, the number of parts in the developing cartridge 1B can be reduced as compared with the case where these capabilities are provided by using different members. In addition, the size of the developing cartridge 1B can be reduced.

<6. Information about Separating Operation>

After the developing cartridge 1B mounted on the drum cartridge 2B is mounted in the image forming apparatus, the developing cartridge 1B can perform a separating operation by the driving force supplied from the image forming apparatus. As used herein, the term "separating operation" refers to an operation to temporarily separate the developing roller 30B from the photosensitive drum 92B. For example, when monochrome printing is performed in the image forming apparatus, the developing cartridges 1B of colors other than black perform the separating operation. Note that the developing cartridge 1B of black color may perform the separating operation.

As illustrated in FIGS. 25-27, when with the developing cartridge 1B is mounted on the drum cartridge 2B, the developing cartridge 1B is placed at a contact position at which the developing roller 30B is in contact with the photosensitive drum 92B. At this time, the position of the first lever 110B is the first position. At the first position, the second convex portion 115B of the first lever 110B is separated from an inner surface of the lever receiving portion 68B. Consequently, the second convex portion 115B of the first lever 110B does not press the inner surface of the lever receiving portion 68B. In addition, the cam surface 113B of the first lever 110B is in contact with the drum frame 91B. Furthermore, the position of the release lever 97B at this time is the third position. At the third position, the second lever arm 972B of the release lever 97B is separated from the pressed protrusion 701B of the second bearing 70B. Consequently, the second lever arm 972B of the release lever 97B does not press the pressed protrusion 701B of the second bearing 70B.

The image forming apparatus applies a driving force to the one end portion 111B of the first lever 110B when the separating operation is performed. More specifically, the image forming apparatus operates a drive lever (not illustrated). Then, the drive lever presses the one end portion 111B of the first lever 110B as indicated by a broken arrow in FIG. 28. Thus, the first lever 110B pivots about the cam surface 133B from the first position to the second position. At this time, the other end portion 112B of the first lever 110B moves in a direction away from the photosensitive drum 92B and presses the inner surface of the lever receiving portion 68B. More specifically, the other end portion 112B of the first lever 110B presses the second end portion 62B of the first bearing 60B in a direction away from the developing roller 30B against the pressing force of the first pressing member 95B. As a result, the first bearing 60B moves in the direction away from the photosensitive drum 92B together with the other end portion 112B of the first lever 110B.

In addition, the image forming apparatus applies a driving force to the first lever arm 971B of the release lever 97B when the separating operation is performed. More specifically, the image forming apparatus operates another drive lever (not illustrated). Then, the drive lever presses the first lever arm 971B as indicated by a broken arrow in FIG. 28. Thus, the release lever 97B pivots about the rotational axis extending in the first direction from the third position to the fourth position. At this time, the second lever arm 972B of the release lever 97B moves in the direction away from the photosensitive drum 92B and presses the pressed protrusion 701B of the second bearing 70B. More specifically, the second lever arm 972B presses the fourth end portion 72B of the second bearing 70B in a direction away from the developing roller 30B against the pressing force of the second pressing member 951B. As a result, the second bearing 70B moves in the direction away from the photosensitive drum 92B together with the second lever arm 972B.

Thus, the casing 10B and the developing roller 30B move in the direction away from the photosensitive drum 92B together with the first bearing 60B and the second bearing 70B. As a result, the outer peripheral surface of the developing roller 30B is separated from the outer peripheral surface of the photosensitive drum 92B. That is, the developing cartridge 1B moves from the above-described contact position to the separated position with respect to the drum cartridge 2B.

As described above, according to the second embodiment, the other end portion 112B of the first lever 110B presses the inner surface of the lever receiving portion 68B in accordance with the force that the one end portion 111B of the first lever 110B receives from the drive lever of the image forming apparatus. In this manner, the force can be applied to move the developing cartridge 1B from the contact position to the separated position. That is, the driving force applied by the image forming apparatus can be transmitted to the first bearing 60B by the first lever 110B having the one end portion 111B that functions as the point of effort, the other end portion 112B that functions as the point of application, and the cam surface 113B that functions as the pivot point.

That is, the driving force supplied by the image forming apparatus is transmitted to the first bearing 60B of the developing cartridge 1B without passing through the drum cartridge 2B. In this manner, the need for providing, in the drum cartridge 2B, a component that relays the driving force is eliminated. Consequently, the number of parts of the drum cartridge 2B can be reduced. As a result, the size of the drum cartridge 2B can be reduced.

In addition, in the developing cartridge 1B, the one end portion 111B of the first lever 110B includes the first convex portion 114B that protrudes in the first direction. For this reason, the surface area of the one end portion 111B of the first lever 110B is wider than in the case where the first convex portion 114B is not provided. Therefore, at the time of the separating operation, the drive lever of the image forming apparatus can stably press the one end portion 111B of the first lever 110B. In this manner, the separating operation performed in the image forming apparatus is stabilized.

In addition, in the developing cartridge 1B, the first bearing 60B and the second bearing 70B which support the developing roller shaft 32B receive a pressing force at the time of the separating operation. Consequently, the number of parts in the developing cartridge 1B can be reduced as compared with the case where a member that receives a pressing force at the time of the separating operation is provided separately from the first bearing 60B and the second bearing 70B. As a result, the size of the developing cartridge 1B can be reduced.

In addition, the first bearing 60B is pivotable about the rotation axis A1. Therefore, the first lever 110B can press the inner surface of the lever receiving portion 68B of the first bearing 60B in an optimum direction.

In addition, when the developing cartridge 1B moves from the contact position to the separated position, the first bearing 60B moves along the second guide surface 94B.

In this manner, the first lever 110B can press the first bearing 60B while maintaining the position of the first bearing 60B relative to the rotation axis A1 serving as the central point. Furthermore, when the developing cartridge 1B moves from the contact position to the separated position, the second bearing 70B moves along the fourth guide surface 941B. In this manner, the release lever 97B can press the second bearing 70B while maintaining the position of the second bearing 70B relative to the rotation axis A1 serving as the central point.

3. Modifications

While an embodiment of the present disclosure has been described above, the present disclosure is not limited to the above-described embodiment. A variety of modifications are described below, focusing on differences between the modifications and the above-described embodiment.

According to the above-described embodiment, the developing cartridge 1 includes the first bearing and the second bearing. The first bearing and the second bearing have the same shape, and both are pivotable with respect to the casing 10. However, a second bearing may be provided having a shape that differs from that of the first bearing. In addition, a second bearing may be provided that is non-pivotable with respect to the casing 10. Furthermore, the developing cartridge 1 does not necessarily have to include the second bearing. In this case, the first bearing can be placed at either one of the ends of the casing 10 in the first direction.

According to the above-described embodiment, the developing cartridge 1 is mounted on the drum cartridge 2 including only one photosensitive drum 92. However, the developing cartridge 1 may be mounted on a drum cartridge including a plurality of photosensitive drums 92.

Furthermore, the shape of the detail of the developing cartridge 1 may differ from the shape illustrated in any one of the drawings of the present application. In addition, the elements appearing in the above-described embodiment and modifications may be combined in any way as long as no conflicts occurs.

What is claimed is:

1. A developing cartridge comprising:

a developing roller rotatable about an axis extending in a first direction;

a casing capable of containing a developer material, the developing roller being located at one end of the casing in a second direction that crosses the first direction; and a lever movable relative to the casing between a first position and a second position, the lever including one end portion, an other end portion separated from the one end portion, and a cam surface that is located between the one end portion and the other end portion, wherein when the lever moves around the cam surface from the first position to the second position in response to movement of the one end portion, wherein the developing cartridge further comprises:

a holder configured to hold the lever relative to the casing, and wherein, the holder prevents the lever from coming off the holder.

2. The developing cartridge according to claim 1, wherein the lever is movable in a third direction, and wherein the holder stops the movement of the lever from one side of the third direction to an other side of the third direction.

3. The developing cartridge according to claim 2, wherein the one end portion of the lever is far away from the other end portion of the lever in the third direction, wherein the one end portion of the lever includes a convex portion protruding in the first direction, and wherein the holder stops movement of the lever from the one side of the third direction to the other side of the third direction by contacting the holder with the convex portion.

4. The developing cartridge according to claim 1, wherein the lever is movable in a third direction, wherein the lever includes:

one end portion; and an other end portion being far away from the one end portion in the third direction, wherein the one end portion of the lever includes a convex portion protruding in the first direction, and wherein the holder stops movement of the lever from the one side of the third direction to the other side of the third direction by contacting the holder with the convex portion.

5. The developing cartridge according to claim 1, wherein the developing cartridge is in connection with a drum cartridge including a photosensitive drum.

* * * * *